(12) United States Patent
Kim et al.

(10) Patent No.: US 11,852,585 B2
(45) Date of Patent: Dec. 26, 2023

(54) COMPOSITIONS AND METHODS FOR EVALUATION OF LIQUID CONTACT ANGLE PROPERTIES

(71) Applicant: THE TEXAS A&M UNIVERSITY SYSTEM, College Station, TX (US)

(72) Inventors: Iltai Isaac Kim, College Station, TX (US); Yang Lie, College Station, TX (US); Jae Sung Park, College Station, TX (US)

(73) Assignee: THE TEXAS A&M UNIVERSITY SYSTEM, College Station, TX (US)

(*) Notice: Subject to any disclaimer, the term of this patent is extended or adjusted under 35 U.S.C. 154(b) by 0 days.

(21) Appl. No.: 17/502,632

(22) Filed: Oct. 15, 2021

(65) Prior Publication Data
US 2022/0120681 A1    Apr. 21, 2022

Related U.S. Application Data

(60) Provisional application No. 63/092,604, filed on Oct. 16, 2020.

(51) Int. Cl.
*G01N 21/552* (2014.01)
*G01N 21/958* (2006.01)
*G01B 11/06* (2006.01)
*G01N 21/55* (2014.01)

(52) U.S. Cl.
CPC ........... *G01N 21/552* (2013.01); *G01B 11/06* (2013.01); *G01N 21/958* (2013.01); *G01N 2021/555* (2013.01)

(58) Field of Classification Search
CPC . G01B 11/06; G01N 21/958; G01N 2021/555
USPC ......................................................... 356/503
See application file for complete search history.

(56) References Cited

U.S. PATENT DOCUMENTS

2005/0243328 A1* 11/2005 Wegmann ............... G03F 7/706
                                                                356/520
2017/0176730 A1*  6/2017 Ford ..................... G02B 3/0087
2020/0116986 A1*  4/2020 Saracco .................. G01S 17/89

FOREIGN PATENT DOCUMENTS

CN            105474085 A  *  4/2016  ............. G02B 5/128

* cited by examiner

*Primary Examiner* — Michael A Lyons
*Assistant Examiner* — Omar H Nixon
(74) *Attorney, Agent, or Firm* — Barnes & Thornburg LLP

(57) ABSTRACT

The present disclosure relates to methods for evaluating features of objects such as liquid droplets and surfaces. More particularly, the present disclosure relates to methods for measuring features such as the contact angle and the thickness of an object such as a liquid droplet or a fingerprint as well as related compositions for evaluation.

20 Claims, 17 Drawing Sheets

FIG. 12A
FIG. 12B
FIG. 12C
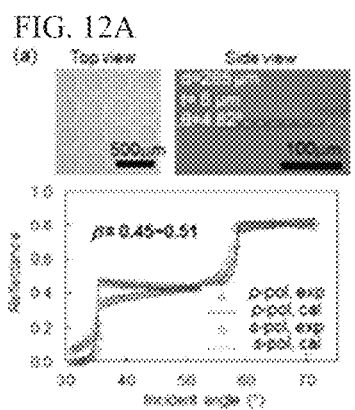
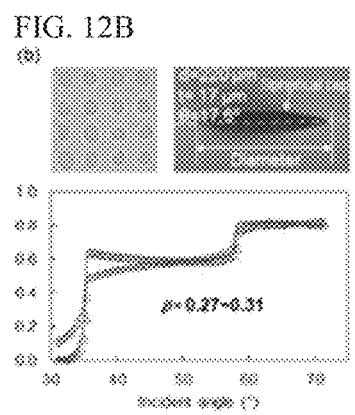
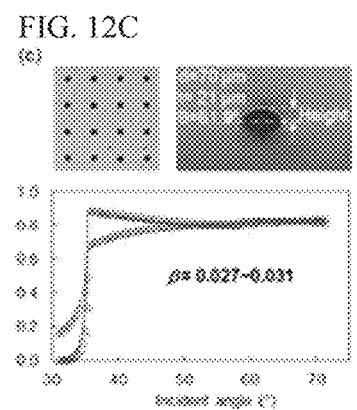

COMPOSITIONS AND METHODS FOR EVALUATION OF LIQUID CONTACT ANGLE PROPERTIES

CROSS-REFERENCE TO RELATED APPLICATIONS

This application claims the benefit under 35 USC § 119(e) of U.S. Provisional Application Ser. No. 63/092,604, filed on Oct. 16, 2020, the entire disclosure of which is incorporated herein by reference

BACKGROUND AND SUMMARY

The present disclosure relates to methods for evaluating features of objects such as liquid droplets and surfaces. More particularly, the present disclosure relates to methods for measuring features such as the contact angle and the thickness of an object such as a liquid droplet or a fingerprint as well as related compositions for evaluation.

The analysis of microscopic features on the surface of an object is exceedingly complex. For instance, a sophisticated microscope system must currently be utilized to evaluate contact angles of droplets and small defects on a surface. Current systems are only capable of scanning a very small area, thus preventing real-time usage for large areas. Moreover, currently available techniques in real-production line rely on time consuming methods such as steam-condensation generation, which monitors droplet formation on the surface by trying to observe abnormal droplet formation caused by surface defect. This method requires considerable time for the steam droplet to evaporate and can result in undesirable surface stain.

Therefore, the present disclosure provides novel methods for evaluating features of objects such as liquid droplets and surfaces. The described methods are able to identify small defects by observing the ultralow contact angle of defect and small thickness without the need to refer to a sophisticated system. For example, the described methods can improve surface coating efficiency and improve production time. In addition, the described methods can be applied regardless of the sample transparency. In the case of transparent samples such as glass, the transmission mode can be used, while in the case of opaque samples such as wafers, the reflection mode can be used.

The present disclosure also provides advantages for optical diagnostics of liquid droplets. For instance, when microcontact printing (µCP) is applied by a stamp with square or circular protrusions, an array of minute droplets can be printed on a target substrate. The surface profile of printed droplet can be characterized with non-monotonic geometrical aspects such as spherical cap, precursor film, and inflection line. The geometrical profile of individual droplet is primarily influenced by the surface energy difference between liquid and substrate. After releasing the stamp from the substrate, the contact line of droplet is expected to recede until the droplet forms a certain shape at an equilibrium state. The resultant droplet forms a dual-profile with an inflection line that partitions a droplet surface geometrically. The upper part of the droplet surface covered from its apex to inflection line takes a nearly spherical-cap shape like a convex lens. From the droplet's edge to inflection line, conversely, the droplet surface shapes in concave upward, which is formed with a foot region and a precursor film. Verifying the geometric shape of droplet surface is important in applications such as micro lens array, evaporation or condensation of sessile droplets, and spreading of droplets.

Various methods of droplet profile measurement based on goniometry, interferometry, total internal reflection fluorescence microscopy (TIRFM), atomic force microscopy (AFM), frustrated total internal reflection (FTIR), and internal reflection are known as well as microscopy techniques used to measure droplet profiles with very thin height and low contact angle, Fizeau interferometry, and internal reflection. In contrast, the present disclosure provides a simple optical method to determine the thin height and low contact angle of micro droplets using internal reflection configuration without complicated microscopy to produce interference fringes depending on the droplet profiles. For instance, the described methods can effectively measure the droplet height from 1 micron to 16 microns with a contact angle from 2.5 to 17 degrees. Accordingly, the described methods can effectively detect the height of a droplet as small as ~1 micron and a contact angle as low as ~1 degree.

The present disclosure also provides advantages for characterization of uneven surface features such as human fingerprinting. For instance, fingerprint pattern characterization is important in the development of antifouling coating materials in the semiconductor industry, the forensic analysis of aging fingerprints and chemical effects, and the recognition of security patterns. In coating materials development for antifouling, few characterizations of fingerprint patterns on different surface coatings exist. Moreover, the characterization of fingerprints with real human sebum is challenging because of its complicated shape and because the real human sebum contains various kinds of liquids and solid particles like a turbid medium, causing difficulty in obtaining consistent measurements.

Accordingly, the described methods provide use of a reflected broad beam profile from the droplet using 3-D ray tracing and modified Fresnel equation modelling and determines morphological features such as the thickness and the contact angle of droplets. As described herein, the A-TIR technique can characterize various size droplets and fingerprint patterns by placing apertures in front of a light detector and selectively blocking aberrated beams from the top curved profiles of droplets and liquid-air interfaces due to quantum shift effects. With an aperture, the measured reflectance demonstrates unique trends by cutting off the scattered or deviated beams compared with a classical measurement without an aperture. The Fresnel equation can be modified with parameters to consider the geometrical features of droplet patterns and the quantum effects of the Goos-Hänchen shift. Parameters can be quantitatively estimated by analyzing the geometry of droplet profiles. Micro- and macro-size droplets are used via A-TIR techniques to explain the origin of the reflected broad beam profile from the droplet, to investigate the effect of the various apertures, and to determine droplet morphological features such as the thickness and the contact angle. Current methods in the art to measure this small thickness are only possible through the counting the number of the fringes in interference using the sophisticated microscope. Furthermore, A-TIR can be also coupled with the internal reflection interference technique to determine other droplet morphological features such as the contact angle, the thickness of the precursor, and the droplet profiles.

In illustrative embodiments, a method of measuring a feature of a liquid droplet is provided. For these embodiments, the method comprises the steps of analyzing the liquid droplet using an apparatus and calculating the feature based on the analysis.

In illustrative embodiments, a method of measuring a feature of a surface is provided. For these embodiments, the method comprises the steps of analyzing the surface using an apparatus and calculating the feature based on the analysis.

In illustrative embodiments, a method of measuring a feature of an object is provided. For these embodiments, the method comprises the steps of analyzing the liquid droplet using aperture total internal reflection (A-TIR) and calculating the feature based on the analysis.

In illustrative embodiments, a measuring a feature of a liquid droplet is provided. For these embodiments, the method comprises the steps of analyzing the liquid droplet using an interference fringe technique and calculating the feature based on the analysis.

In illustrative embodiments, a method of measuring a feature of a surface is provided. For these embodiments, the method comprises the steps of analyzing the surface using an interference fringe technique and calculating the feature based on the analysis.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 5A:
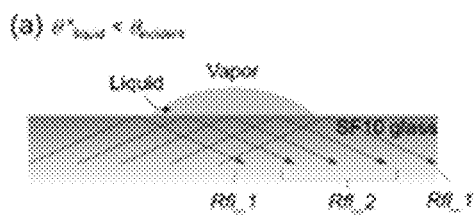
Figure 5B:
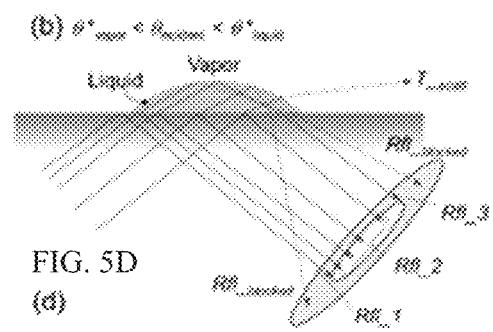
Figure 5C:
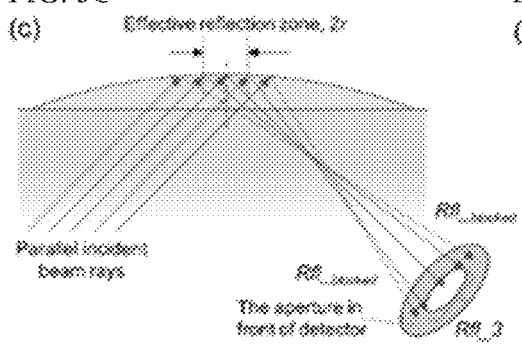
Figure 5D:
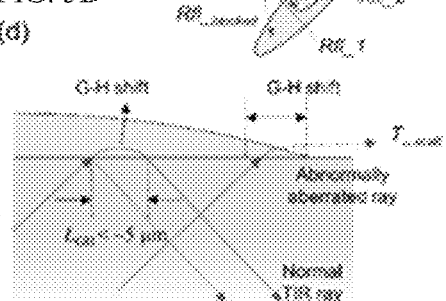

FIGS. 5A-5D show an illustration of aperture total internal reflection (A-TIR) occurring with micro droplet on glass substrate. Ray tracing with two different range of incident angle (FIG. 5A) $\theta^*_{liquid} < \theta_{incident}$ and (FIG. 5B) $\theta^*_{vapor} < \theta_{incident} < \theta^*_{liquid}$. FIG. 5C: Concept of effective reflection zone and aperture for specific reflectance curves. FIG. 5D: Effect of Goos-Hänchen shift on the aberration of TIR beam path.

Figure 6:
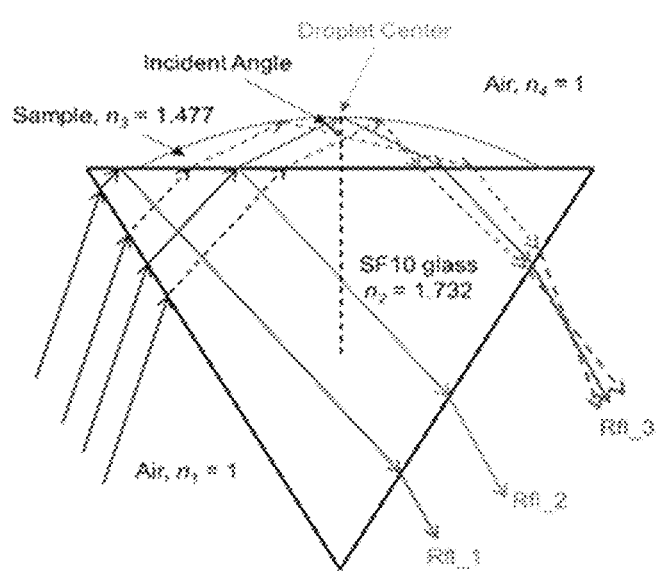

FIG. 6 shows optical ray-tracing generated from the total internal reflection with a liquid droplet on a glass substrate based on an equilateral triangle prism.

Figure 7A:
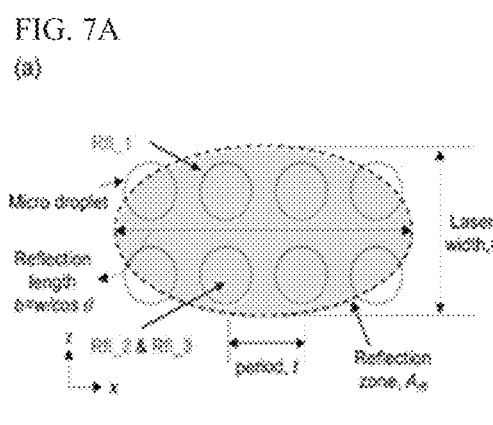
Figure 7B:
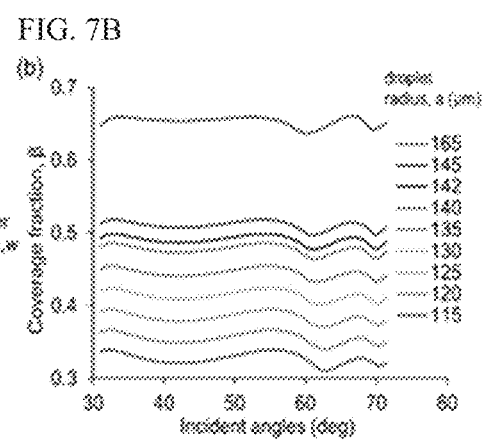

FIGS. 7A-7B show coverage fraction of β as a function of incident angles for various diameters. a is the radius of the droplet. The maximum standard deviation of β is 0.9%.

Figure 8A:
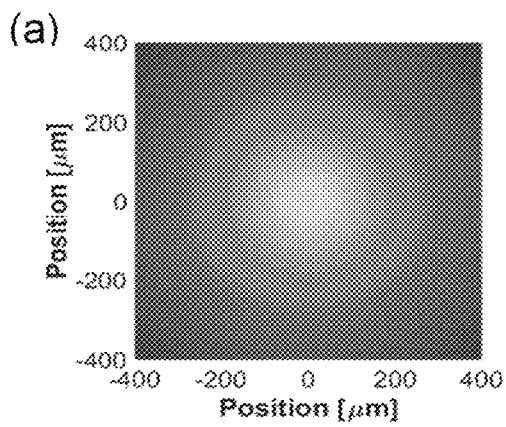
Figure 8B:
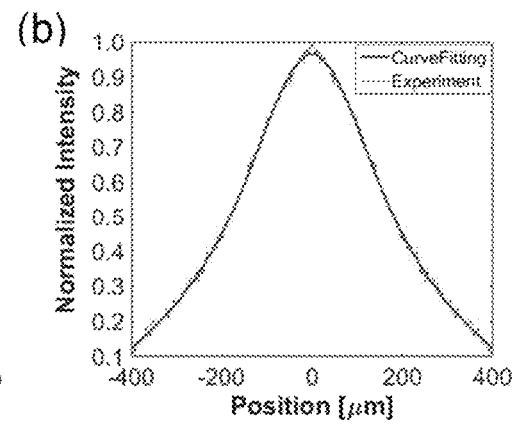

FIGS. 8A-8B show the experimentally measured laser intensity distribution (FIG. 8A) and the centerline distribution along the center dash-dot line (FIG. 8B) with its curve fitted line.

Figure 9:
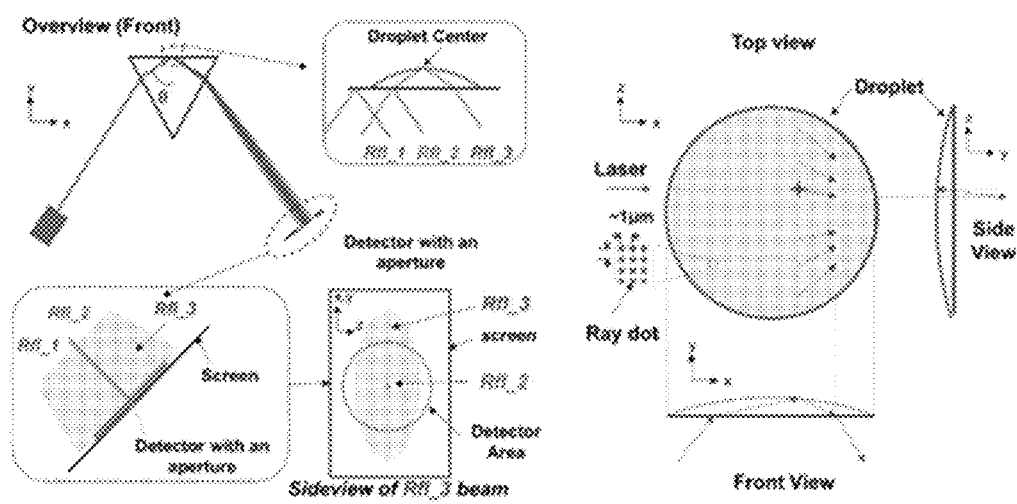

FIG. 9 shows a schematic of 3-D ray tracing with the modified Fresnel equation.

Figure 10:
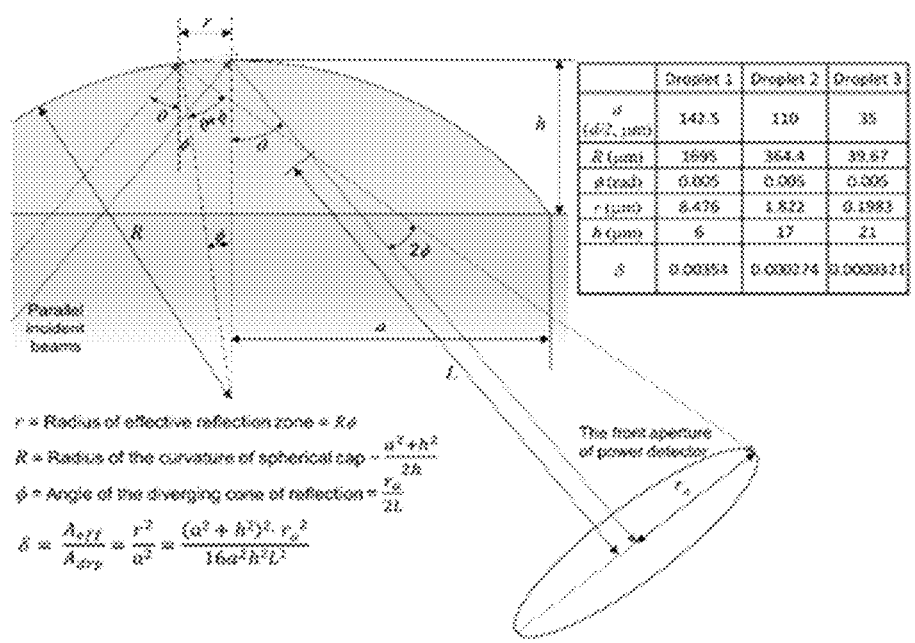

FIG. 10 shows 2-D modeling for Rfl_3 calculation using the effective reflection zone of droplet surface and the relevant equations to calculate the flatness ratio, δ. L is the distance from the droplet to the detector and measured as 100 mm. $r_a$ is the radius of the aperture, 1 mm.

Figure 11:
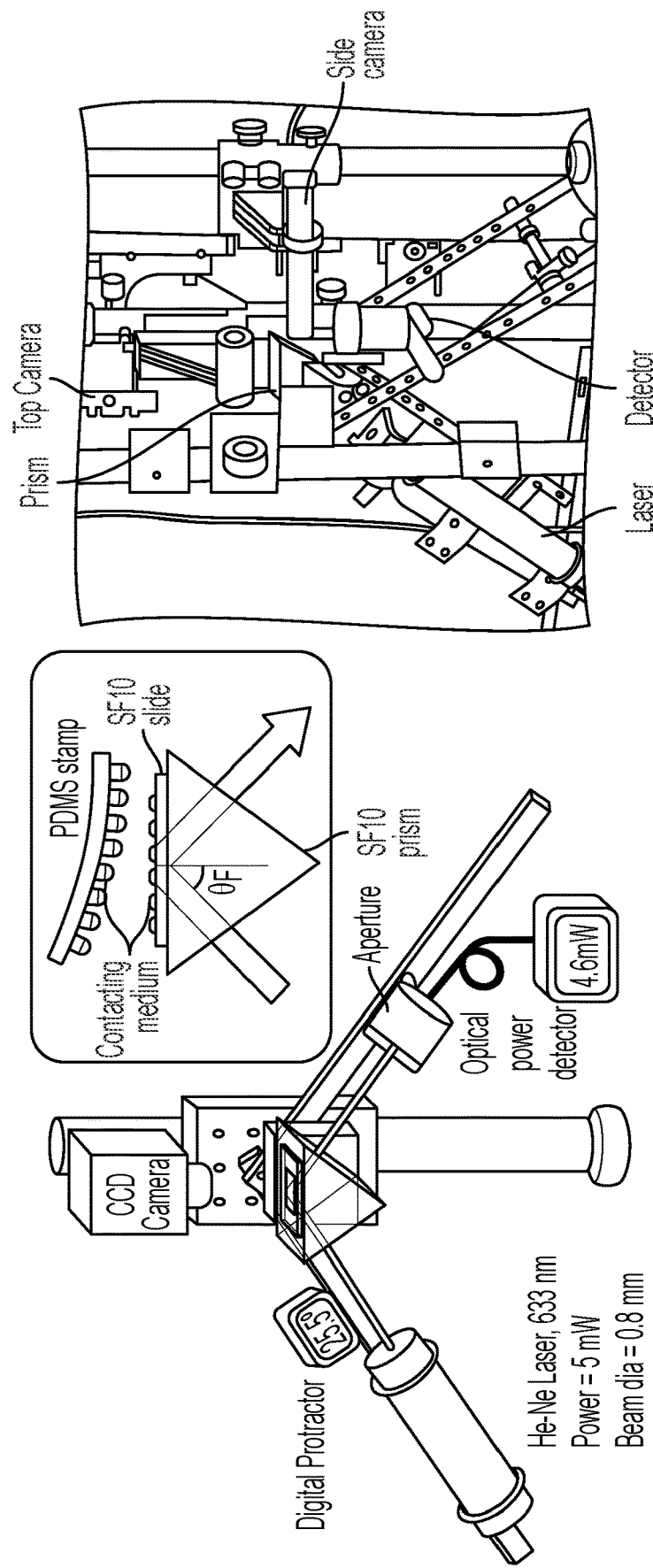

FIG. 11 shows a schematic diagram (left) and a photograph (right) of experimental setup.

FIGS. 12A-12C show different droplet patterns and morphological parameters depending on differently coated surfaces. Reflectance curve for PDMS stamped micro-droplets on differently coated surfaces. Measurement and simulation are denoted in symbols and lines, respectively: the oleophilic coating (FIG. 12A), the plain glass (FIG. 12B), and the oleophobic coating (FIG. 12C).

Figure 13A:
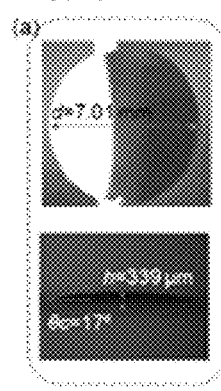
Figure 13B:
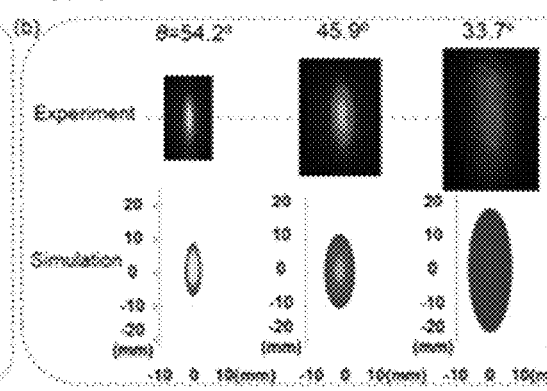
Figure 13C:
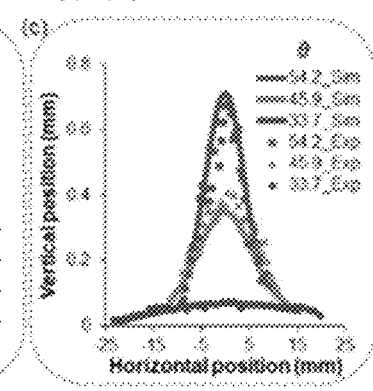

FIGS. 13A-13C show photos of macro-droplet in top and side view (FIG. 13A), the beam profiles of Rfl_3 at various angles from the experiment and the simulation (FIG. 13B), and the centerline beam profile (Rfl_3) (FIG. 13C). In Rfl_3 beam profile, the experiment is from the captured image on the screen in FIG. 9 and the simulation is from the 3-D ray tracing with the modified Fresnel equation. The centerline profile is along the dash-dot line in FIG. 13B.

Figure 14:
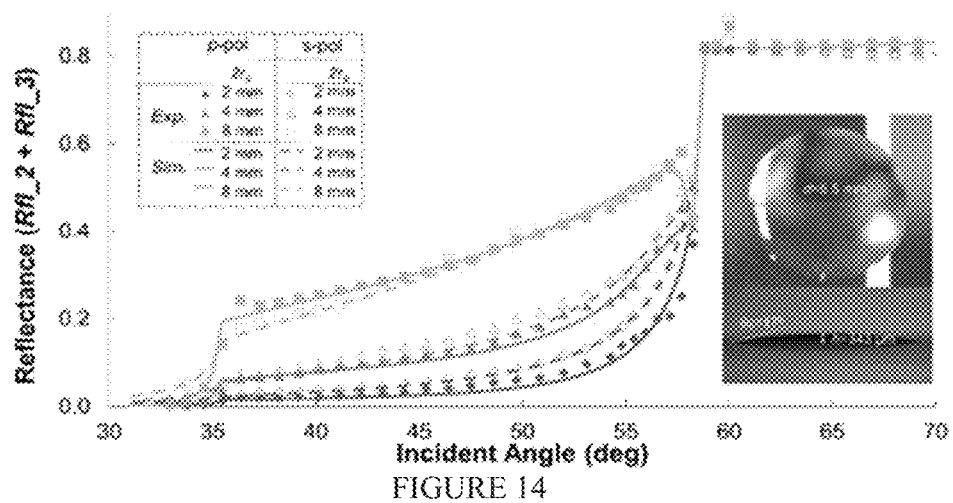

FIG. 14 shows a reflectance curve in p and s polarizations with various aperture sizes (2, 4, and 8 mm in diameter) versus incident angles for the macro-sized droplet measured at the location of 150 mm away from the sample. The inset figure shows the top and side view of the macro droplet.

Figure 15A:
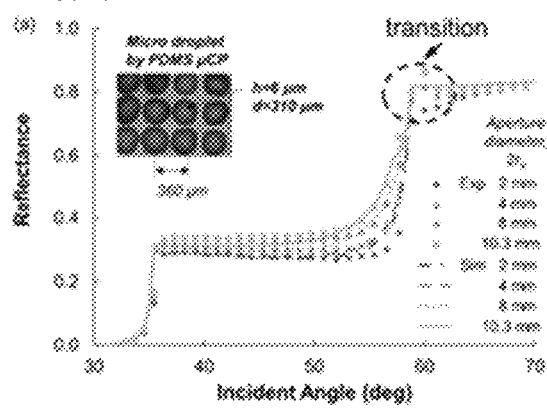
Figure 15B:
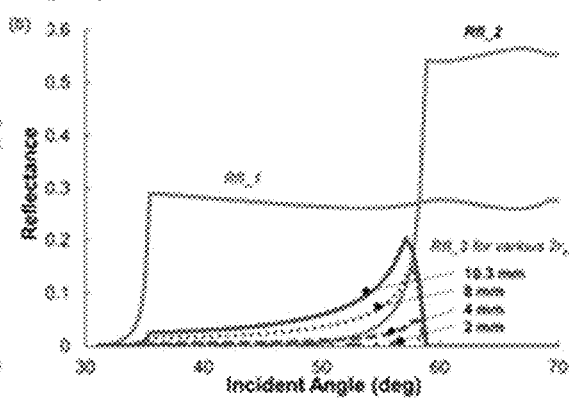

FIGS. 15A-15B show reflectance curves in p-polarization with various apertures (2, 4, 8, and 10.3 mm in diameter) for micro droplet pattern. FIG. 15A shows the total reflectance shows the experiment in symbols and the simulation in lines. FIG. 15B shows the contribution of each reflectance is colored as blue (Rfl_1), green (Rfl_2), and red (Rfl_3).

Figure 16:
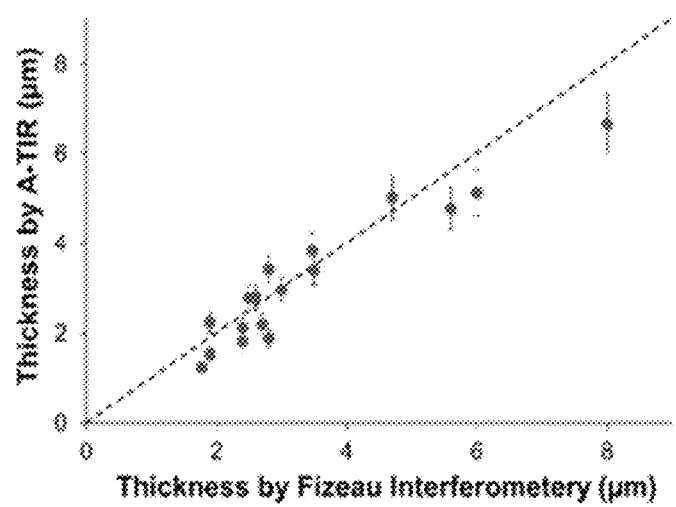

FIG. 16 shows the droplet thickness determination.

Figure 17:
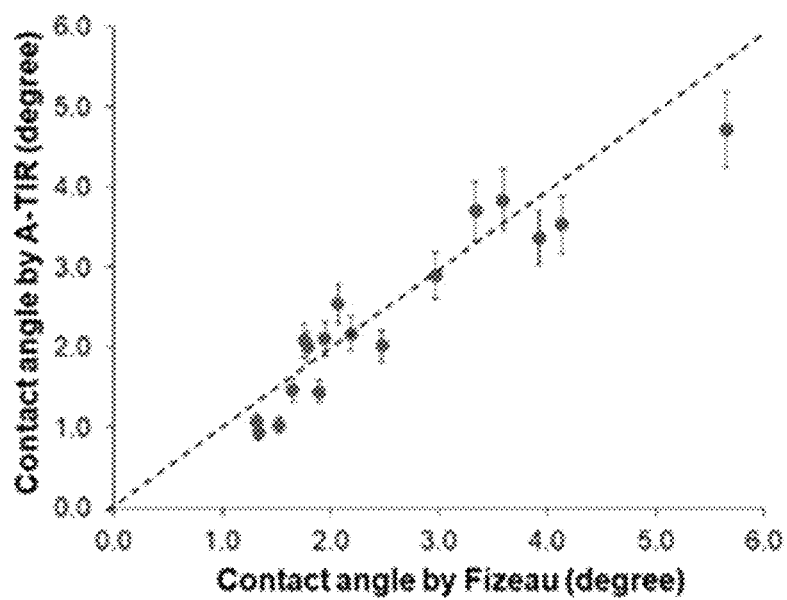

FIG. 17 shows the contact angle determination.

DETAILED DESCRIPTION

In an illustrative aspect, a method of measuring a feature of a liquid droplet is provided. For these embodiments, the method comprises the steps of analyzing the liquid droplet using an apparatus and calculating the feature based on the analysis.

In an embodiment, the feature is a contact angle of the liquid droplet. In an embodiment, the contact angle is between 0 degrees and 90 degrees. In an embodiment, the contact angle is between 15 degrees and 30 degrees. In an embodiment, the contact angle is between 30 degrees and 45 degrees. In an embodiment, the contact angle is between 45 degrees and 60 degrees. In an embodiment, the contact angle is between 60 degrees and 75 degrees. In an embodiment, the contact angle is between 75 degrees and 90 degrees. In an embodiment, the contact angle is less than 20 degrees. In an embodiment, the contact angle is less than 15 degrees. In an embodiment, the contact angle is less than 10 degrees. In an embodiment, the contact angle is less than 5 degrees. Unexpectedly, the described methods are capable of measuring a small contact angle such as those less than 5 degrees.

In an embodiment, the feature is thickness of the liquid droplet. In an embodiment, the thickness is a macroscale thickness. In an embodiment, the thickness is a microscale thickness. In an embodiment, the thickness is a nanoscale thickness. In an embodiment, the thickness is less than 5 μm. Unexpectedly, the described methods are capable of measuring a small thickness such as those less than 5 μm.

In an embodiment, the feature is a surface profile of the liquid droplet. In an embodiment, the surface profile is a dual surface profile. In an embodiment, the surface profile is a precursor film profile.

In an embodiment, the analysis comprises side view imaging. In an embodiment, the side view imaging measures the contact angle of the liquid droplet. In an embodiment, the contact angle is utilized for determining a refractive index. For instance, side view imaging can be utilized to measure the contact angle of the liquid droplet and then utilize the contact angle to determine of refractive index (RI) of an unknown liquid, for example using an interference fringe technique.

In an embodiment, the analysis comprises optical reflection. In an embodiment, the analysis comprises a refractive index. In an embodiment, the analysis comprises reflection interference. In an embodiment, the analysis comprises transmission interference. In an embodiment, the analysis comprises ray tracing. In an embodiment, the analysis comprises optical ray tracing. In an embodiment, the analysis comprises 3-D ray tracing. In an embodiment, the analysis comprises Fizeau interferometry. In an embodiment, the analysis comprises total internal reflection (TIR).

In an embodiment, the analysis comprises aperture total internal reflection (A-TIR). In an embodiment, the A-TIR comprises placement of one or more apertures in front of a detector in total internal reflection (TIR) configuration. In an embodiment, at least two apertures are utilized. In an embodiment, at least three apertures are utilized. In an embodiment, at least four apertures are utilized.

In an embodiment, the analysis comprises an interference fringe technique. In an embodiment, the analysis comprises modified Frensel modeling.

In an embodiment, the apparatus comprises a laser. In an embodiment, the laser is a UV laser. In an embodiment, the laser is a LED laser. In an embodiment, the laser is a UV LED laser. In an embodiment, the laser is a deep UV LED laser.

In an embodiment, the apparatus comprises a laser magnifier. In an embodiment, the apparatus comprises an interference screen. In an embodiment, the apparatus comprises a light-sensitive plate. In an embodiment, the apparatus comprises a camera. In an embodiment, the camera is a CCD camera. In an embodiment, the camera is a CMOS camera.

In an embodiment, the calculating comprises use of one or more algorithms. Various algorithms are described herein and can be utilized as part of the method. Furthermore, other algorithms may be known to a person of ordinary skill in the art and could potentially be utilized as part of the described methods.

In an embodiment, the method provides real-time monitoring of the feature. In an embodiment, the method provides full-field monitoring of the feature.

In an embodiment, the liquid droplet is printed on a target substrate. In an embodiment, the printing is microcontact printing (μCP).

In an illustrative aspect, a method of measuring a feature of a surface is provided. For these embodiments, the method comprises the steps of analyzing the surface using an apparatus and calculating the feature based on the analysis.

In an embodiment, the surface is a fingerprint surface. In an embodiment, the surface is a coated surface. In an embodiment, the surface is a surface of an electronic device. In an embodiment, the surface is a coated surface of an electronic device. In an embodiment, the electronic device is a smartphone. In an embodiment, the electronic device is a computer. In an embodiment, the coated surface is a touchscreen. In an embodiment, the surface comprises a defect. In an embodiment, the defect is a nanoscale defect.

In an embodiment, the feature is a contact angle of the surface. In an embodiment, the contact angle is between 0 degrees and 90 degrees. In an embodiment, the contact angle is between 15 degrees and 30 degrees. In an embodiment, the contact angle is between 30 degrees and 45 degrees. In an embodiment, the contact angle is between 45 degrees and 60 degrees. In an embodiment, the contact angle is between 60 degrees and 75 degrees. In an embodiment, the contact angle is between 75 degrees and 90 degrees. In an embodiment, the contact angle is less than 20 degrees. In an embodiment, the contact angle is less than 15 degrees. In an embodiment, the contact angle is less than 10 degrees. In an embodiment, the contact angle is less than 5 degrees. Unexpectedly, the described methods are capable of measuring a small contact angle such as those less than 5 degrees.

In an embodiment, the feature is thickness of the surface. In an embodiment, the thickness is a macroscale thickness. In an embodiment, the thickness is a microscale thickness. In an embodiment, the thickness is a nanoscale thickness. In an embodiment, the thickness is less than 5 μm. Unexpectedly, the described methods are capable of measuring a small thickness such as those less than 5 μm.

The previously described embodiments of the method of measuring a feature of a liquid droplet are applicable to the method of measuring a feature of a surface described herein.

In an illustrative aspect, a method of measuring a feature of an object is provided. For these embodiments, the method comprises the steps of analyzing the object using aperture total internal reflection (A-TIR) and calculating the feature based on the analysis.

In an embodiment, the A-TIR comprises placement of one or more apertures in front of a detector in total internal reflection (TIR) configuration. In an embodiment, at least two apertures are utilized. In an embodiment, at least three apertures are utilized. In an embodiment, at least four apertures are utilized.

In an embodiment, the object is a liquid droplet. In an embodiment, the object is a surface.

In an embodiment, the analysis considers morphological features selected from the group consisting of thickness, surface coverage fraction, effective flatness ratio, Goos-Hänchen shift ratio, and any combination thereof.

The previously described embodiments of the method of measuring a feature of a liquid droplet and the method of measuring a feature of a surface are applicable to the method of measuring a feature of an object described herein.

In an illustrative aspect, a method of measuring a feature of a liquid droplet is provided. For these embodiments, the method comprises the steps of analyzing the liquid droplet using an interference fringe technique and calculating the feature based on the analysis.

In an embodiment, the interference fringe technique comprises analysis of one or more reflection interference fringes. In an embodiment, the interference fringe technique comprises analysis of one or more transmitted interference fringes. In an embodiment, the interference fringe technique comprises analysis of one or more fringes in number. In an embodiment, the interference fringe technique comprises analysis of one or more fringe radius measurements.

The previously described embodiments of the method of measuring a feature of a liquid droplet are applicable to the second method of measuring a feature of a liquid droplet described herein.

In an illustrative aspect, a method of measuring a feature of a surface is provided. For these embodiments, the method comprises the steps of analyzing the surface using an interference fringe technique and calculating the feature based on the analysis.

In an embodiment, the interference fringe technique comprises analysis of one or more reflection interference fringes. In an embodiment, the interference fringe technique comprises analysis of one or more transmitted interference fringes. In an embodiment, the interference fringe technique comprises analysis of one or more fringes in number. In an embodiment, the interference fringe technique comprises analysis of one or more fringe radius measurements.

The previously described embodiments of the method of measuring a feature of a surface are applicable to the second method of measuring a feature of a surface described herein.

The following numbered embodiments are contemplated and are non-limiting:

1. A method of measuring a feature of a liquid droplet, said method comprising the steps of analyzing the liquid droplet using an apparatus and calculating the feature based on the analysis.
2. The method of clause 1, any other suitable clause, or any combination of suitable clauses, wherein the feature is a contact angle of the liquid droplet.
3. The method of clause 2, any other suitable clause, or any combination of suitable clauses, wherein the contact angle is between 0 degrees and 90 degrees.
4. The method of clause 2, any other suitable clause, or any combination of suitable clauses, wherein the contact angle is between 15 degrees and 30 degrees.
5. The method of clause 2, any other suitable clause, or any combination of suitable clauses, wherein the contact angle is between 30 degrees and 45 degrees.
6. The method of clause 2, any other suitable clause, or any combination of suitable clauses, wherein the contact angle is between 45 degrees and 60 degrees.
7. The method of clause 2, any other suitable clause, or any combination of suitable clauses, wherein the contact angle is between 60 degrees and 75 degrees.
8. The method of clause 2, any other suitable clause, or any combination of suitable clauses, wherein the contact angle is between 75 degrees and 90 degrees.
9. The method of clause 2, any other suitable clause, or any combination of suitable clauses, wherein the contact angle is less than 20 degrees.
10. The method of clause 2, any other suitable clause, or any combination of suitable clauses, wherein the contact angle is less than 15 degrees.
11. The method of clause 2, any other suitable clause, or any combination of suitable clauses, wherein the contact angle is less than 10 degrees.
12. The method of clause 2, any other suitable clause, or any combination of suitable clauses, wherein the contact angle is less than 5 degrees.
13. The method of clause 1, any other suitable clause, or any combination of suitable clauses, wherein the feature is thickness of the liquid droplet.
14. The method of clause 13, any other suitable clause, or any combination of suitable clauses, wherein the thickness is a macroscale thickness.
15. The method of clause 13, any other suitable clause, or any combination of suitable clauses, wherein the thickness is a microscale thickness.
16. The method of clause 13, any other suitable clause, or any combination of suitable clauses, wherein the thickness is a nanoscale thickness.
17. The method of clause 13, any other suitable clause, or any combination of suitable clauses, wherein the thickness is less than 5 µm.
18. The method of clause 1, any other suitable clause, or any combination of suitable clauses, wherein the feature is a surface profile of the liquid droplet.
19. The method of clause 18, any other suitable clause, or any combination of suitable clauses, wherein the surface profile is a dual surface profile.
20. The method of clause 18, any other suitable clause, or any combination of suitable clauses, wherein the surface profile is a precursor film profile.
21. The method of clause 1, any other suitable clause, or any combination of suitable clauses, wherein the analysis comprises side view imaging.
22. The method of clause 21, any other suitable clause, or any combination of suitable clauses, wherein the side view imaging measures the contact angle of the liquid droplet.
23. The method of clause 22, any other suitable clause, or any combination of suitable clauses, wherein the contact angle is utilized for determining a refractive index.
24. The method of clause 1, any other suitable clause, or any combination of suitable clauses, wherein the analysis comprises optical reflection.
25. The method of clause 1, any other suitable clause, or any combination of suitable clauses, wherein the analysis comprises a refractive index.
26. The method of clause 1, any other suitable clause, or any combination of suitable clauses, wherein the analysis comprises reflection interference.
27. The method of clause 1, any other suitable clause, or any combination of suitable clauses, wherein the analysis comprises transmission interference.
28. The method of clause 1, any other suitable clause, or any combination of suitable clauses, wherein the analysis comprises ray tracing.
29. The method of clause 1, any other suitable clause, or any combination of suitable clauses, wherein the analysis comprises optical ray tracing.
30. The method of clause 1, any other suitable clause, or any combination of suitable clauses, wherein the analysis comprises 3-D ray tracing.
31. The method of clause 1, any other suitable clause, or any combination of suitable clauses, wherein the analysis comprises Fizeau interferometry.
32. The method of clause 1, any other suitable clause, or any combination of suitable clauses, wherein the analysis comprises total internal reflection (TIR).
33. The method of clause 1, any other suitable clause, or any combination of suitable clauses, wherein the analysis comprises aperture total internal reflection (A-TIR).
34. The method of clause 33, any other suitable clause, or any combination of suitable clauses, wherein the A-TIR comprises placement of one or more apertures in front of a detector in total internal reflection (TIR) configuration.
35. The method of clause 34, any other suitable clause, or any combination of suitable clauses, wherein at least two apertures are utilized.
36. The method of clause 34, any other suitable clause, or any combination of suitable clauses, wherein at least three apertures are utilized.
37. The method of clause 34, any other suitable clause, or any combination of suitable clauses, wherein at least four apertures are utilized.
38. The method of clause 1, any other suitable clause, or any combination of suitable clauses, wherein the analysis comprises an interference fringe technique.
39. The method of clause 1, any other suitable clause, or any combination of suitable clauses, wherein the analysis comprises modified Frensel modeling.
40. The method of clause 1, any other suitable clause, or any combination of suitable clauses, wherein the apparatus comprises a laser.

41. The method of clause 40, any other suitable clause, or any combination of suitable clauses, wherein the laser is a UV laser.
42. The method of clause 40, any other suitable clause, or any combination of suitable clauses, wherein the laser is a LED laser.
43. The method of clause 40, any other suitable clause, or any combination of suitable clauses, wherein the laser is a UV LED laser.
44. The method of clause 40, any other suitable clause, or any combination of suitable clauses, wherein the laser is a deep UV LED laser.
45. The method of clause 1, any other suitable clause, or any combination of suitable clauses, wherein the apparatus comprises a laser magnifier.
46. The method of clause 1, any other suitable clause, or any combination of suitable clauses, wherein the apparatus comprises an interference screen.
47. The method of clause 1, any other suitable clause, or any combination of suitable clauses, wherein the apparatus comprises a light-sensitive plate.
48. The method of clause 1, any other suitable clause, or any combination of suitable clauses, wherein the apparatus comprises a camera.
49. The method of clause 48, any other suitable clause, or any combination of suitable clauses, wherein the camera is a CCD camera.
50. The method of clause 48, any other suitable clause, or any combination of suitable clauses, wherein the camera is a CMOS camera.
51. The method of clause 1, any other suitable clause, or any combination of suitable clauses, wherein the calculating comprises use of one or more algorithms.
52. The method of clause 1, any other suitable clause, or any combination of suitable clauses, wherein the method provides real-time monitoring of the feature.
53. The method of clause 1, any other suitable clause, or any combination of suitable clauses, wherein the method provides full-field monitoring of the feature.
54. The method of clause 1, any other suitable clause, or any combination of suitable clauses, wherein the liquid droplet is printed on a target substrate.
55. The method of clause 54, any other suitable clause, or any combination of suitable clauses, wherein the printing is microcontact printing (µCP).
56. A method of measuring a feature of a surface, said method comprising the steps of analyzing the surface using an apparatus and calculating the feature based on the analysis.
57. The method of clause 56, any other suitable clause, or any combination of suitable clauses, wherein the surface is a fingerprint surface.
58. The method of clause 56, any other suitable clause, or any combination of suitable clauses, wherein the surface is a coated surface.
59. The method of clause 56, any other suitable clause, or any combination of suitable clauses, wherein the surface is a surface of an electronic device.
60. The method of clause 56, any other suitable clause, or any combination of suitable clauses, wherein the surface is a coated surface of an electronic device.
61. The method of clause 60, any other suitable clause, or any combination of suitable clauses, wherein the electronic device is a smartphone.
62. The method of clause 60, any other suitable clause, or any combination of suitable clauses, wherein the electronic device is a computer.
63. The method of clause 60, any other suitable clause, or any combination of suitable clauses, wherein the coated surface is a touchscreen.
64. The method of clause 56, any other suitable clause, or any combination of suitable clauses, wherein the surface comprises a defect.
65. The method of clause 64, any other suitable clause, or any combination of suitable clauses, wherein the defect is a nanoscale defect.
66. The method of clause 56, any other suitable clause, or any combination of suitable clauses, wherein the feature is a contact angle of the surface.
67. The method of clause 66, any other suitable clause, or any combination of suitable clauses, wherein the contact angle is between 0 degrees and 90 degrees.
68. The method of clause 66, any other suitable clause, or any combination of suitable clauses, wherein the contact angle is between 15 degrees and 30 degrees.
69. The method of clause 66, any other suitable clause, or any combination of suitable clauses, wherein the contact angle is between 30 degrees and 45 degrees.
70. The method of clause 66, any other suitable clause, or any combination of suitable clauses, wherein the contact angle is between 45 degrees and 60 degrees.
71. The method of clause 66, any other suitable clause, or any combination of suitable clauses, wherein the contact angle is between 60 degrees and 75 degrees.
72. The method of clause 66, any other suitable clause, or any combination of suitable clauses, wherein the contact angle is between 75 degrees and 90 degrees.
73. The method of clause 66, any other suitable clause, or any combination of suitable clauses, wherein the contact angle is less than 20 degrees.
74. The method of clause 66, any other suitable clause, or any combination of suitable clauses, wherein the contact angle is less than 15 degrees.
75. The method of clause 66, any other suitable clause, or any combination of suitable clauses, wherein the contact angle is less than 10 degrees.
76. The method of clause 66, any other suitable clause, or any combination of suitable clauses, wherein the contact angle is less than 5 degrees.
77. The method of clause 56, any other suitable clause, or any combination of suitable clauses, wherein the feature is thickness of the surface.
78. The method of clause 77, any other suitable clause, or any combination of suitable clauses, wherein the thickness is a macroscale thickness.
79. The method of clause 77, any other suitable clause, or any combination of suitable clauses, wherein the thickness is a microscale thickness.
80. The method of clause 77, any other suitable clause, or any combination of suitable clauses, wherein the thickness is a nanoscale thickness.
81. The method of clause 77, any other suitable clause, or any combination of suitable clauses, wherein the thickness is less than 5 µm.
82. The method of clause 56, any other suitable clause, or any combination of suitable clauses, wherein the analysis comprises side view imaging.
83. The method of clause 82, any other suitable clause, or any combination of suitable clauses, wherein the side view imaging measures the contact angle of the surface.
84. The method of clause 83, any other suitable clause, or any combination of suitable clauses, wherein the contact angle is utilized for determining a refractive index.

85. The method of clause 56, any other suitable clause, or any combination of suitable clauses, wherein the analysis comprises optical reflection.
86. The method of clause 56, any other suitable clause, or any combination of suitable clauses, wherein the analysis comprises a refractive index.
87. The method of clause 56, any other suitable clause, or any combination of suitable clauses, wherein the analysis comprises reflection interference.
88. The method of clause 56, any other suitable clause, or any combination of suitable clauses, wherein the analysis comprises transmission interference.
89. The method of clause 56, any other suitable clause, or any combination of suitable clauses, wherein the analysis comprises ray tracing.
90. The method of clause 56, any other suitable clause, or any combination of suitable clauses, wherein the analysis comprises optical ray tracing.
91. The method of clause 56, any other suitable clause, or any combination of suitable clauses, wherein the analysis comprises 3-D ray tracing.
92. The method of clause 56, any other suitable clause, or any combination of suitable clauses, wherein the analysis comprises Fizeau interferometry.
93. The method of clause 56, any other suitable clause, or any combination of suitable clauses, wherein the analysis comprises total internal reflection (TIR).
94. The method of clause 56, any other suitable clause, or any combination of suitable clauses, wherein the analysis comprises aperture total internal reflection (A-TIR).
95. The method of clause 94, any other suitable clause, or any combination of suitable clauses, wherein the A-TIR comprises placement of one or more apertures in front of a detector in total internal reflection (TIR) configuration.
96. The method of clause 95, any other suitable clause, or any combination of suitable clauses, wherein at least two apertures are utilized.
97. The method of clause 95, any other suitable clause, or any combination of suitable clauses, wherein at least three apertures are utilized.
98. The method of clause 95, any other suitable clause, or any combination of suitable clauses, wherein at least four apertures are utilized.
99. The method of clause 56, any other suitable clause, or any combination of suitable clauses, wherein the analysis comprises an interference fringe technique.
100. The method of clause 56, any other suitable clause, or any combination of suitable clauses, wherein the analysis comprises modified Frensel modeling.
101. The method of clause 56, any other suitable clause, or any combination of suitable clauses, wherein the apparatus comprises a laser.
102. The method of clause 101, any other suitable clause, or any combination of suitable clauses, wherein the laser is a UV laser.
103. The method of clause 101, any other suitable clause, or any combination of suitable clauses, wherein the laser is a LED laser.
104. The method of clause 101, any other suitable clause, or any combination of suitable clauses, wherein the laser is a UV LED laser.
105. The method of clause 101, any other suitable clause, or any combination of suitable clauses, wherein the laser is a deep UV LED laser.
106. The method of clause 56, any other suitable clause, or any combination of suitable clauses, wherein the apparatus comprises a laser magnifier.
107. The method of clause 56, any other suitable clause, or any combination of suitable clauses, wherein the apparatus comprises an interference screen.
108. The method of clause 56, any other suitable clause, or any combination of suitable clauses, wherein the apparatus comprises a light-sensitive plate.
109. The method of clause 56, any other suitable clause, or any combination of suitable clauses, wherein the apparatus comprises a camera.
110. The method of clause 109, any other suitable clause, or any combination of suitable clauses, wherein the camera is a CCD camera.
111. The method of clause 109, any other suitable clause, or any combination of suitable clauses, wherein the camera is a CMOS camera.
112. The method of clause 56, any other suitable clause, or any combination of suitable clauses, wherein the calculating comprises use of one or more algorithms.
113. The method of clause 56, any other suitable clause, or any combination of suitable clauses, wherein the method provides real-time monitoring of the feature.
114. The method of clause 56, any other suitable clause, or any combination of suitable clauses, wherein the method provides full-field monitoring of the feature.
115. A method of measuring a feature of an object, said method comprising the step of analyzing the object using aperture total internal reflection (A-TIR) and calculating the feature based on the analysis.
116. The method of clause 115, any other suitable clause, or any combination of suitable clauses, wherein the A-TIR comprises placement of one or more apertures in front of a detector in total internal reflection (TIR) configuration.
117. The method of clause 116, any other suitable clause, or any combination of suitable clauses, wherein at least two apertures are utilized.
118. The method of clause 116, any other suitable clause, or any combination of suitable clauses, wherein at least three apertures are utilized.
119. The method of clause 116, any other suitable clause, or any combination of suitable clauses, wherein at least four apertures are utilized.
120. The method of clause 115, any other suitable clause, or any combination of suitable clauses, wherein the object is a liquid droplet.
121. The method of clause 120, any other suitable clause, or any combination of suitable clauses, wherein the feature is a contact angle of the liquid droplet.
122. The method of clause 121, any other suitable clause, or any combination of suitable clauses, wherein the contact angle is between 0 degrees and 90 degrees.
123. The method of clause 121, any other suitable clause, or any combination of suitable clauses, wherein the contact angle is between 15 degrees and 30 degrees.
124. The method of clause 121, any other suitable clause, or any combination of suitable clauses, wherein the contact angle is between 30 degrees and 45 degrees.
125. The method of clause 121, any other suitable clause, or any combination of suitable clauses, wherein the contact angle is between 45 degrees and 60 degrees.
126. The method of clause 121, any other suitable clause, or any combination of suitable clauses, wherein the contact angle is between 60 degrees and 75 degrees.

127. The method of clause 121, any other suitable clause, or any combination of suitable clauses, wherein the contact angle is between 75 degrees and 90 degrees.
128. The method of clause 121, any other suitable clause, or any combination of suitable clauses, wherein the contact angle is less than 20 degrees.
129. The method of clause 121, any other suitable clause, or any combination of suitable clauses, wherein the contact angle is less than 15 degrees.
130. The method of clause 121, any other suitable clause, or any combination of suitable clauses, wherein the contact angle is less than 10 degrees.
131. The method of clause 121, any other suitable clause, or any combination of suitable clauses, wherein the contact angle is less than 5 degrees.
132. The method of clause 120, any other suitable clause, or any combination of suitable clauses, wherein the feature is thickness of the liquid droplet.
133. The method of clause 132, any other suitable clause, or any combination of suitable clauses, wherein the thickness is a macroscale thickness.
134. The method of clause 132, any other suitable clause, or any combination of suitable clauses, wherein the thickness is a microscale thickness.
135. The method of clause 132, any other suitable clause, or any combination of suitable clauses, wherein the thickness is a nanoscale thickness.
136. The method of clause 132, any other suitable clause, or any combination of suitable clauses, wherein the thickness is less than 5 µm.
137. The method of clause 120, any other suitable clause, or any combination of suitable clauses, wherein the feature is a surface profile of the liquid droplet.
138. The method of clause 137, any other suitable clause, or any combination of suitable clauses, wherein the surface profile is a dual surface profile.
139. The method of clause 137, any other suitable clause, or any combination of suitable clauses, wherein the surface profile is a precursor film profile.
140. The method of clause 115, any other suitable clause, or any combination of suitable clauses, wherein the object is a surface.
141. The method of clause 140, any other suitable clause, or any combination of suitable clauses, wherein the surface is a fingerprint surface.
142. The method of clause 140, any other suitable clause, or any combination of suitable clauses, wherein the surface is a coated surface.
143. The method of clause 140, any other suitable clause, or any combination of suitable clauses, wherein the surface is a surface of an electronic device.
144. The method of clause 140, any other suitable clause, or any combination of suitable clauses, wherein the surface is a coated surface of an electronic device.
145. The method of clause 144, any other suitable clause, or any combination of suitable clauses, wherein the electronic device is a smartphone.
146. The method of clause 144, any other suitable clause, or any combination of suitable clauses, wherein the electronic device is a computer.
147. The method of clause 144, any other suitable clause, or any combination of suitable clauses, wherein the coated surface is a touchscreen.
148. The method of clause 140, any other suitable clause, or any combination of suitable clauses, wherein the surface comprises a defect.
149. The method of clause 148, any other suitable clause, or any combination of suitable clauses, wherein the feature comprises the defect.
150. The method of clause 148, any other suitable clause, or any combination of suitable clauses, wherein the defect is a nanoscale defect.
151. The method of clause 115, any other suitable clause, or any combination of suitable clauses, wherein the analysis considers morphological features selected from the group consisting of thickness, surface coverage fraction, effective flatness ratio, Goos-Hänchen shift ratio, and any combination thereof.
152. The method of clause 115, any other suitable clause, or any combination of suitable clauses, wherein the A-TIR comprises placement of one or more apertures in front of a detector in total internal reflection (TIR) configuration.
153. The method of clause 152, any other suitable clause, or any combination of suitable clauses, wherein at least two apertures are utilized.
154. The method of clause 152, any other suitable clause, or any combination of suitable clauses, wherein at least three apertures are utilized.
155. The method of clause 152, any other suitable clause, or any combination of suitable clauses, wherein at least four apertures are utilized.
156. The method of clause 115, any other suitable clause, or any combination of suitable clauses, wherein the analysis comprises side view imaging.
157. The method of clause 156, any other suitable clause, or any combination of suitable clauses, wherein the side view imaging measures the contact angle of the object.
158. The method of clause 157, any other suitable clause, or any combination of suitable clauses, wherein the contact angle is utilized for determining a refractive index.
159. The method of clause 115, any other suitable clause, or any combination of suitable clauses, wherein the analysis comprises optical reflection.
160. The method of clause 115, any other suitable clause, or any combination of suitable clauses, wherein the analysis comprises a refractive index.
161. The method of clause 115, any other suitable clause, or any combination of suitable clauses, wherein the analysis comprises reflection interference.
162. The method of clause 115, any other suitable clause, or any combination of suitable clauses, wherein the analysis comprises transmission interference.
163. The method of clause 115, any other suitable clause, or any combination of suitable clauses, wherein the analysis comprises ray tracing.
164. The method of clause 115, any other suitable clause, or any combination of suitable clauses, wherein the analysis comprises optical ray tracing.
165. The method of clause 115, any other suitable clause, or any combination of suitable clauses, wherein the analysis comprises 3-D ray tracing.
166. The method of clause 115, any other suitable clause, or any combination of suitable clauses, wherein the analysis comprises Fizeau interferometry.
167. The method of clause 115, any other suitable clause, or any combination of suitable clauses, wherein the analysis comprises total internal reflection (TIR).
168. The method of clause 115, any other suitable clause, or any combination of suitable clauses, wherein the analysis comprises an interference fringe technique.

169. The method of clause 115, any other suitable clause, or any combination of suitable clauses, wherein the analysis comprises modified Frensel modeling.
170. The method of clause 115, any other suitable clause, or any combination of suitable clauses, wherein the apparatus comprises a laser.
171. The method of clause 170, any other suitable clause, or any combination of suitable clauses, wherein the laser is a UV laser.
172. The method of clause 170, any other suitable clause, or any combination of suitable clauses, wherein the laser is a LED laser.
173. The method of clause 170, any other suitable clause, or any combination of suitable clauses, wherein the laser is a UV LED laser.
174. The method of clause 170, any other suitable clause, or any combination of suitable clauses, wherein the laser is a deep UV LED laser.
175. The method of clause 115, any other suitable clause, or any combination of suitable clauses, wherein the apparatus comprises a laser magnifier.
176. The method of clause 115, any other suitable clause, or any combination of suitable clauses, wherein the apparatus comprises an interference screen.
177. The method of clause 115, any other suitable clause, or any combination of suitable clauses, wherein the apparatus comprises a light-sensitive plate.
178. The method of clause 115, any other suitable clause, or any combination of suitable clauses, wherein the apparatus comprises a camera.
179. The method of clause 178, any other suitable clause, or any combination of suitable clauses, wherein the camera is a CCD camera.
180. The method of clause 170, any other suitable clause, or any combination of suitable clauses, wherein the camera is a CMOS camera.
181. The method of clause 115, any other suitable clause, or any combination of suitable clauses, wherein the calculating comprises use of one or more algorithms.
182. The method of clause 115, any other suitable clause, or any combination of suitable clauses, wherein the method provides real-time monitoring of the feature.
183. The method of clause 115, any other suitable clause, or any combination of suitable clauses, wherein the method provides full-field monitoring of the feature.
184. A method of measuring a feature of a liquid droplet, said method comprising the step of analyzing the liquid droplet using an interference fringe technique and calculating the feature based on the analysis.
185. The method of clause 184, any other suitable clause, or any combination of suitable clauses, wherein the feature is a contact angle of the liquid droplet.
186. The method of clause 185, any other suitable clause, or any combination of suitable clauses, wherein the contact angle is between 0 degrees and 90 degrees.
187. The method of clause 185, any other suitable clause, or any combination of suitable clauses, wherein the contact angle is between 15 degrees and 30 degrees.
188. The method of clause 185, any other suitable clause, or any combination of suitable clauses, wherein the contact angle is between 30 degrees and 45 degrees.
189. The method of clause 185, any other suitable clause, or any combination of suitable clauses, wherein the contact angle is between 45 degrees and 60 degrees.
190. The method of clause 185, any other suitable clause, or any combination of suitable clauses, wherein the contact angle is between 60 degrees and 75 degrees.
191. The method of clause 185, any other suitable clause, or any combination of suitable clauses, wherein the contact angle is between 75 degrees and 90 degrees.
192. The method of clause 185, any other suitable clause, or any combination of suitable clauses, wherein the contact angle is less than 20 degrees.
193. The method of clause 185, any other suitable clause, or any combination of suitable clauses, wherein the contact angle is less than 15 degrees.
194. The method of clause 185, any other suitable clause, or any combination of suitable clauses, wherein the contact angle is less than 10 degrees.
195. The method of clause 185, any other suitable clause, or any combination of suitable clauses, wherein the contact angle is less than 5 degrees.
196. The method of clause 184, any other suitable clause, or any combination of suitable clauses, wherein the feature is thickness of the liquid droplet.
197. The method of clause 196, any other suitable clause, or any combination of suitable clauses, wherein the thickness is a macroscale thickness.
198. The method of clause 196, any other suitable clause, or any combination of suitable clauses, wherein the thickness is a microscale thickness.
199. The method of clause 196, any other suitable clause, or any combination of suitable clauses, wherein the thickness is a nanoscale thickness.
200. The method of clause 196, any other suitable clause, or any combination of suitable clauses, wherein the thickness is less than 5 m.
201. The method of clause 184, any other suitable clause, or any combination of suitable clauses, wherein the feature is a surface profile of the liquid droplet.
202. The method of clause 201, any other suitable clause, or any combination of suitable clauses, wherein the surface profile is a dual surface profile.
203. The method of clause 201, any other suitable clause, or any combination of suitable clauses, wherein the surface profile is a precursor film profile.
204. The method of clause 184, any other suitable clause, or any combination of suitable clauses, wherein the feature is a refractive index of the liquid droplet.
205. The method of clause 184, any other suitable clause, or any combination of suitable clauses, wherein the interference fringe technique comprises analysis of one or more reflection interference fringes.
206. The method of clause 184, any other suitable clause, or any combination of suitable clauses, wherein the interference fringe technique comprises analysis of one or more transmitted interference fringes.
207. The method of clause 184, any other suitable clause, or any combination of suitable clauses, wherein the interference fringe technique comprises analysis of one or more fringes in number.
208. The method of clause 184, any other suitable clause, or any combination of suitable clauses, wherein the interference fringe technique comprises analysis of one or more The method of clause 184, any other suitable clause, or any combination of suitable clauses, wherein radius measurements.
209. The method of clause 184, any other suitable clause, or any combination of suitable clauses, wherein the analysis comprises side view imaging.
210. The method of clause 209, any other suitable clause, or any combination of suitable clauses, wherein the side view imaging measures the contact angle of the liquid droplet.

211. The method of clause 210, any other suitable clause, or any combination of suitable clauses, wherein the contact angle is utilized for determining a refractive index of the liquid droplet.

212. The method of clause 184, any other suitable clause, or any combination of suitable clauses, wherein the analysis comprises optical reflection.

213. The method of clause 184, any other suitable clause, or any combination of suitable clauses, wherein the analysis comprises a refractive index.

214. The method of clause 184, any other suitable clause, or any combination of suitable clauses, wherein the analysis comprises ray tracing.

215. The method of clause 184, any other suitable clause, or any combination of suitable clauses, wherein the analysis comprises optical ray tracing.

216. The method of clause 184, any other suitable clause, or any combination of suitable clauses, wherein the analysis comprises 3-D ray tracing.

217. The method of clause 184, any other suitable clause, or any combination of suitable clauses, wherein the analysis comprises Fizeau interferometry.

218. The method of clause 184, any other suitable clause, or any combination of suitable clauses, wherein the analysis comprises total internal reflection (TIR).

219. The method of clause 184, any other suitable clause, or any combination of suitable clauses, wherein the analysis comprises modified Frensel modeling.

220. The method of clause 184, any other suitable clause, or any combination of suitable clauses, wherein the analysis is performed with an apparatus.

221. The method of clause 220, any other suitable clause, or any combination of suitable clauses, wherein the apparatus comprises a laser.

222. The method of clause 221, any other suitable clause, or any combination of suitable clauses, wherein the laser is a UV laser.

223. The method of clause 221, any other suitable clause, or any combination of suitable clauses, wherein the laser is a LED laser.

224. The method of clause 221, any other suitable clause, or any combination of suitable clauses, wherein the laser is a UV LED laser.

225. The method of clause 221, any other suitable clause, or any combination of suitable clauses, wherein the laser is a deep UV LED laser.

226. The method of clause 220, any other suitable clause, or any combination of suitable clauses, wherein the apparatus comprises a laser magnifier.

227. The method of clause 220, any other suitable clause, or any combination of suitable clauses, wherein the apparatus comprises an interference screen.

228. The method of clause 220, any other suitable clause, or any combination of suitable clauses, wherein the apparatus comprises a light-sensitive plate.

229. The method of clause 220, any other suitable clause, or any combination of suitable clauses, wherein the apparatus comprises a camera.

230. The method of clause 229, any other suitable clause, or any combination of suitable clauses, wherein the camera is a CCD camera.

231. The method of clause 229, any other suitable clause, or any combination of suitable clauses, wherein the camera is a CMOS camera.

232. The method of clause 184, any other suitable clause, or any combination of suitable clauses, wherein the calculating comprises use of one or more algorithms.

233. The method of clause 184, any other suitable clause, or any combination of suitable clauses, wherein the method provides real-time monitoring of the feature.

234. The method of clause 184, any other suitable clause, or any combination of suitable clauses, wherein the method provides full-field monitoring of the feature.

235. The method of clause 184, any other suitable clause, or any combination of suitable clauses, wherein the liquid droplet is printed on a target substrate.

236. The method of clause 236, any other suitable clause, or any combination of suitable clauses, wherein the printing is microcontact printing (μCP).

237. A method of measuring a feature of a surface, said method comprising the step of analyzing the surface using an interference fringe technique and calculating the feature based on the analysis.

238. The method of clause 237, any other suitable clause, or any combination of suitable clauses, wherein the surface is a fingerprint surface.

239. The method of clause 237, any other suitable clause, or any combination of suitable clauses, wherein the surface is a coated surface.

240. The method of clause 237, any other suitable clause, or any combination of suitable clauses, wherein the surface is a surface of an electronic device.

241. The method of clause 237, any other suitable clause, or any combination of suitable clauses, wherein the surface is a coated surface of an electronic device.

242. The method of clause 241, any other suitable clause, or any combination of suitable clauses, wherein the electronic device is a smartphone.

243. The method of clause 241, any other suitable clause, or any combination of suitable clauses, wherein the electronic device is a computer.

244. The method of clause 241, any other suitable clause, or any combination of suitable clauses, wherein the coated surface is a touchscreen.

245. The method of clause 237, any other suitable clause, or any combination of suitable clauses, wherein the surface comprises a defect.

246. The method of clause 245, any other suitable clause, or any combination of suitable clauses, wherein the defect is a nanoscale defect.

247. The method of clause 237, any other suitable clause, or any combination of suitable clauses, wherein the feature is a contact angle of the surface.

248. The method of clause 247, any other suitable clause, or any combination of suitable clauses, wherein the contact angle is between 0 degrees and 90 degrees.

249. The method of clause 247, any other suitable clause, or any combination of suitable clauses, wherein the contact angle is between 15 degrees and 30 degrees.

250. The method of clause 247, any other suitable clause, or any combination of suitable clauses, wherein the contact angle is between 30 degrees and 45 degrees.

251. The method of clause 247, any other suitable clause, or any combination of suitable clauses, wherein the contact angle is between 45 degrees and 60 degrees.

252. The method of clause 247, any other suitable clause, or any combination of suitable clauses, wherein the contact angle is between 60 degrees and 75 degrees.

253. The method of clause 247, any other suitable clause, or any combination of suitable clauses, wherein the contact angle is between 75 degrees and 90 degrees.

254. The method of clause 247, any other suitable clause, or any combination of suitable clauses, wherein the contact angle is less than 20 degrees.

255. The method of clause 247, any other suitable clause, or any combination of suitable clauses, wherein the contact angle is less than 15 degrees.
256. The method of clause 247, any other suitable clause, or any combination of suitable clauses, wherein the contact angle is less than 10 degrees.
257. The method of clause 247, any other suitable clause, or any combination of suitable clauses, wherein the contact angle is less than 5 degrees.
258. The method of clause 237, any other suitable clause, or any combination of suitable clauses, wherein the feature is thickness of the surface.
259. The method of clause 258, any other suitable clause, or any combination of suitable clauses, wherein the thickness is a macroscale thickness.
260. The method of clause 258, any other suitable clause, or any combination of suitable clauses, wherein the thickness is a microscale thickness.
261. The method of clause 258, any other suitable clause, or any combination of suitable clauses, wherein the thickness is a nanoscale thickness.
262. The method of clause 258, any other suitable clause, or any combination of suitable clauses, wherein the thickness is less than 5 μm.
263. The method of clause 237, any other suitable clause, or any combination of suitable clauses, wherein the feature is a surface profile of the surface.
264. The method of clause 263, any other suitable clause, or any combination of suitable clauses, wherein the surface profile is a dual surface profile.
265. The method of clause 263, any other suitable clause, or any combination of suitable clauses, wherein the surface profile is a precursor film profile.
266. The method of clause 237, any other suitable clause, or any combination of suitable clauses, wherein the feature is a refractive index of the surface.
267. The method of clause 237, any other suitable clause, or any combination of suitable clauses, wherein the interference fringe technique comprises analysis of one or more reflection interference fringes.
268. The method of clause 237, any other suitable clause, or any combination of suitable clauses, wherein the interference fringe technique comprises analysis of one or more transmitted interference fringes.
269. The method of clause 237, any other suitable clause, or any combination of suitable clauses, wherein the interference fringe technique comprises analysis of one or more fringes in number.
270. The method of clause 237, any other suitable clause, or any combination of suitable clauses, wherein the interference fringe technique comprises analysis of one or more fringe radius measurements.
271. The method of clause 237, any other suitable clause, or any combination of suitable clauses, wherein the analysis comprises side view imaging.
272. The method of clause 271, any other suitable clause, or any combination of suitable clauses, wherein the side view imaging measures the contact angle of the surface.
273. The method of clause 272, any other suitable clause, or any combination of suitable clauses, wherein the contact angle is utilized for determining a refractive index of the surface.
274. The method of clause 237, any other suitable clause, or any combination of suitable clauses, wherein the analysis comprises optical reflection.
275. The method of clause 237, any other suitable clause, or any combination of suitable clauses, wherein the analysis comprises a refractive index.
276. The method of clause 237, any other suitable clause, or any combination of suitable clauses, wherein the analysis comprises ray tracing.
277. The method of clause 237, any other suitable clause, or any combination of suitable clauses, wherein the analysis comprises optical ray tracing.
278. The method of clause 237, any other suitable clause, or any combination of suitable clauses, wherein the analysis comprises 3-D ray tracing.
279. The method of clause 237, any other suitable clause, or any combination of suitable clauses, wherein the analysis comprises Fizeau interferometry.
280. The method of clause 237, any other suitable clause, or any combination of suitable clauses, wherein the analysis comprises total internal reflection (TIR).
281. The method of clause 237, any other suitable clause, or any combination of suitable clauses, wherein the analysis comprises modified Frensel modeling.
282. The method of clause 237, any other suitable clause, or any combination of suitable clauses, wherein the analysis is performed with an apparatus.
283. The method of clause 282, any other suitable clause, or any combination of suitable clauses, wherein the apparatus comprises a laser.
284. The method of clause 283, any other suitable clause, or any combination of suitable clauses, wherein the laser is a UV laser.
285. The method of clause 283, any other suitable clause, or any combination of suitable clauses, wherein the laser is a LED laser.
286. The method of clause 283, any other suitable clause, or any combination of suitable clauses, wherein the laser is a UV LED laser.
287. The method of clause 283, any other suitable clause, or any combination of suitable clauses, wherein the laser is a deep UV LED laser.
288. The method of clause 282, any other suitable clause, or any combination of suitable clauses, wherein the apparatus comprises a laser magnifier.
289. The method of clause 282, any other suitable clause, or any combination of suitable clauses, wherein the apparatus comprises an interference screen.
290. The method of clause 282, any other suitable clause, or any combination of suitable clauses, wherein the apparatus comprises a light-sensitive plate.
291. The method of clause 282, any other suitable clause, or any combination of suitable clauses, wherein the apparatus comprises a camera.
292. The method of clause 291, any other suitable clause, or any combination of suitable clauses, wherein the camera is a CCD camera.
293. The method of clause 291, any other suitable clause, or any combination of suitable clauses, wherein the camera is a CMOS camera.
294. The method of clause 237, any other suitable clause, or any combination of suitable clauses, wherein the calculating comprises use of one or more algorithms.
295. The method of clause 237, any other suitable clause, or any combination of suitable clauses, wherein the method provides real-time monitoring of the feature.
296. The method of clause 237, any other suitable clause, or any combination of suitable clauses, wherein the method provides full-field monitoring of the feature.

297. The method of clause 237, any other suitable clause, or any combination of suitable clauses, wherein the surface is printed on a target substrate.

298. The method of clause 298, any other suitable clause, or any combination of suitable clauses, wherein the printing is microcontact printing (μCP).

EXAMPLES

Example 1

Dual Profile of Droplet Surface

Figure 1:
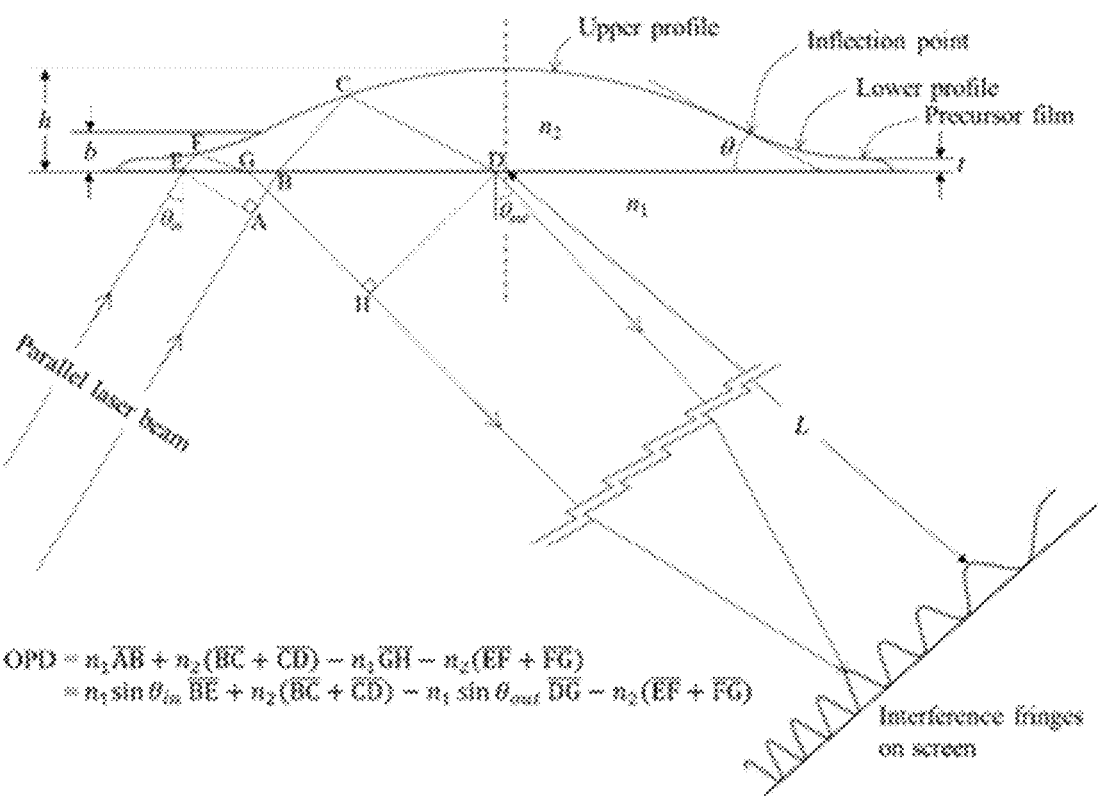
FIG. 1 shows a dual droplet profile of micro droplet that produces the interference fringes on screen.

A sessile droplet is formed with two parts in its surface profile. One part is an upper profile that is a macroscopic dorm placing on the apex of droplet. The second part is a lower profile that is mesoscopic film attached at the contact line of droplet. Both profiles are connected along an inflection line (FIG. 1). The dual droplet profile is defined with several parameters such as the droplet's height (h), the droplet's radius (r), the radial (a) and the axial (b) coordinates of inflection line, and the thickness of precursor film.

In the instant example the upper profile shape is presumed to be a spherical cap and the lower profile shape is presumed to be a hyperbola curve. The contact angle of droplet is defined as the slope of droplet surface at the inflection point. The profile of spherical cap can be obtained with droplet height, the coordinates of inflection point, and a contact angle that is associated with the curvature of spherical cap. The profile of hyperbola curve (Va and Vb) is obtained from the thickness (t~100 nm) of precursor film and the coordinates (a and b) of inflection point. The precursor film ranges from a few tens Å up to several hundred nanometers according to thermodynamic equilibrium condition of droplet on a substrate.

Microcontact printing (μCP) was applied to form an array of sessile droplets on a glass surface. This method was performed by a polydimethylsiloxane (PDMS) stamp which transferred sample fluid onto a pristine substrate by contact manner. Soft lithography was applied to fabricate the PDMS stamp having an array of micro pillars, which was conventionally operated with a pattern mask, a micro UV aligner, a hot plate, and some chemicals such as Sylgard 184 silicone elastomer (Dow Corning Inc.) and SU-8 photoresist (Microchem Corp.). A stamp having a square protrusion with the widths of 200 μm and the height of 200 μm was made.

Figure 3:
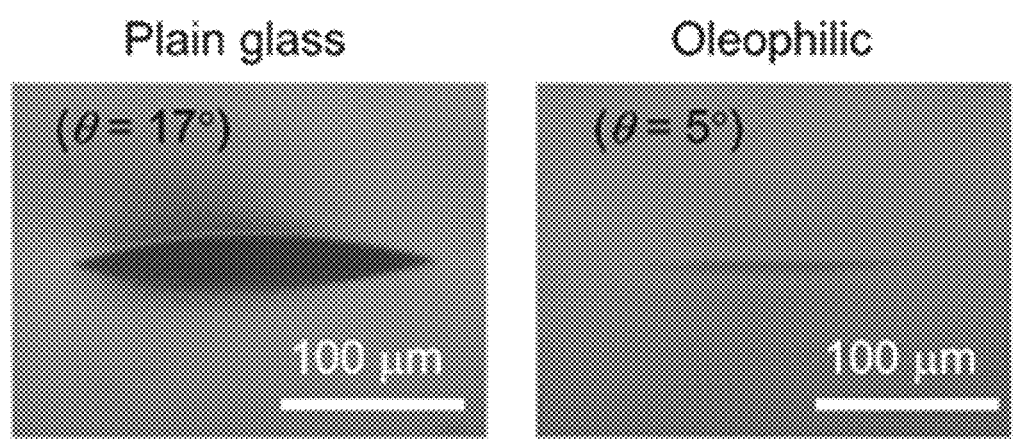
FIG. 3 shows different microdroplet profiles on the different coating conditions.

FIG. 3 presents representative side-views of droplets transferred by microcontact printing on different coating surfaces. Tiny droplets with low contact angle were generated since small, thin droplets make distinct fringe patterns on screen. The volume of droplet is proportional to the amount of sample fluid being pendant on the tip of stamp protrusion or syringe needle. In addition, it can alter along the different adhesion forces of sample fluid on substrate. The diameter (radius) of the droplet is somewhat accurate in the measured data, but the thickness (height) and the contact angle seem to be quite different.

Example 2

Internal Reflection and Interference Fringes

The interference fringe is made by the internal reflection (IR) system with an equilateral triangle prism (SF10, n=1.732 at 633 nm). The optical ray tracing about total internal reflection on a droplet surface is illustrated in FIG. 1. A droplet is placed on the upper side of prism. A He—Ne laser (λ=633 nm) is used as a light source to produce the interferometric fringes of light on a screen. A coherent, parallel beam (w=0.8 mm) of a laser is incident on the left side of prism and reflects on the upper surface of liquid droplet. Total internal reflection associated with a liquid droplet involves the optical aberration of reflection beam due to the curved profile of droplet surface. The laser beam reflected on the droplet surface is not parallel any more while it passes out through the right side of prism. Eventually, due to the dual profile of droplet surface, the laser beam arrives at different coordinates on a screen according to the position of droplet surface on which it reflects. The interference phenomenon occurs when two optical rays reflected on the upper and lower profiles meet at the same location of screen. The intensity of interfered light depends on the phase difference between both rays, which changes periodically from the center to the out-most of light illumination. The consequential interfered light appears as the concentric fringe pattern.

Figure 4:
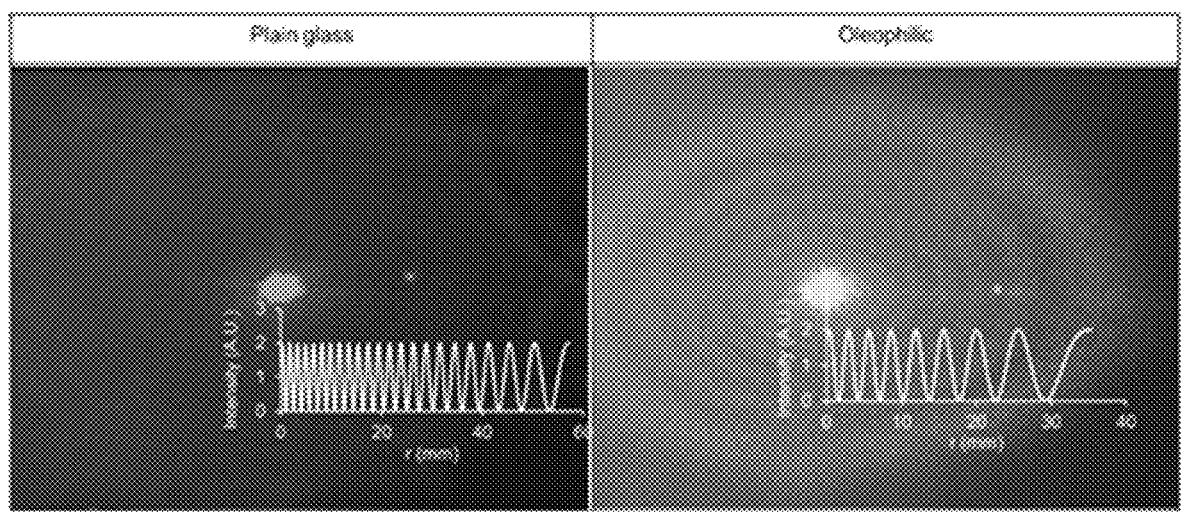
FIG. 4 shows photographic images for the interference fringes on plain glass (left) and on oleophilic coated glass (right). The figure also shows the simulated interference fringes and provide acceptable agreement.

FIG. 4 shows the photographic images for the microdroplets in FIG. 3 on the plain and oleophilic glasses, respectively. Note that the microdroplet on the oleophobic coated glass does not show the formation of the interference fringes because of its thick profile which is also verified during the simulation, indicating there is no dual profiles. The images are captured at the incidence angle of 43.2°. The simulation generates the same number of fringes with the corresponding locations according to the ray-tracing scheme.

Example 3

Optical Path Difference

Figure 2:
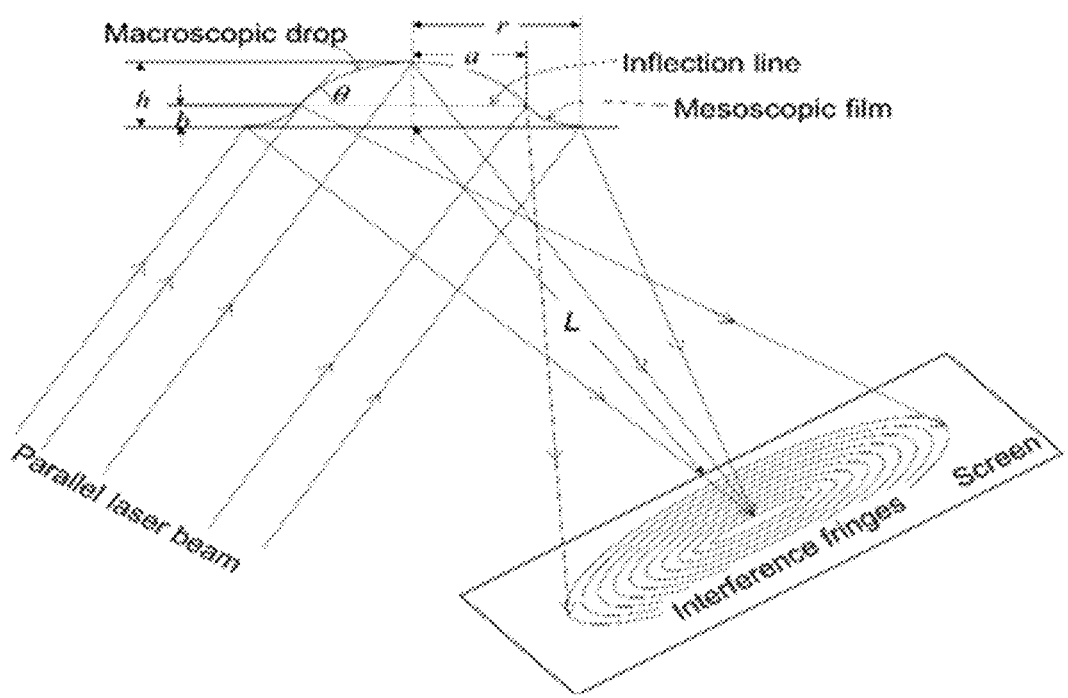
FIG. 2 shows a schematic diagram of optical path difference.

Calculating the optical path difference is determined by how the interference fringes are formed on the screen. Two parallel rays are reflected on the dual profile of the droplet and projected to the same point on the screen, which is far away from the droplet (L) (FIG. 2). The optical path difference (OPD) between the two beams can be seen as the distance difference between line ABCD and line EFGH. The recursive OPD formula is obtained by multiplying the physical distance by the refractive index of the medium.

$$OPD = n_1\overline{AB} + n_2(\overline{BC} + \overline{CD}) - n_1\overline{GH} - n_2(\overline{EF} + \overline{FG}) =$$
$$n_1\sin\theta_{in}\overline{BE} + n_2(\overline{BC} + \overline{CD}) - n_1\sin\theta_{out}\overline{DG} - n_2(\overline{EF} + \overline{FG})$$

The interference patterns appearing on the screen are related to the OPD obtained in the previous step. If the OPD is an integral multiple of the wavelength of the laser beam used, constructive interference occurs to create a bright pattern. There is a dark area between the two bright patterns, which occurs when the OPD is an integer multiple of the wavelength and there is an additional ½ (one-half) degree difference. The fringe pattern created on the screen is determined by the shape of the droplet. The size of the total interference fringe, the diameter of the outermost fringe, is related to the contact angle of the droplet.

The higher the slope at the inflection point, the greater the direction of the reflected light. The number of fringes of the interferogram is related to the thickness (height) of the droplet because the range of OPD increases and the number of interferences increases.

Based on this OPD calculation, a simulation algorithm was developed and implemented using Matlab (R2019b) to calculate its number of interference fringes and the fringe radius Example 4

Aperture Total Internal Reflection (A-TIR) Applications

Total internal reflection occurs when a wave propagating in a medium of higher refractive index ($n_1$) strikes a boundary surface with another medium of lower refractive index ($n_2$) at an angle larger than a particular critical angle ($\theta^*$) with respect to the normal to the boundary. An important angle is the angle of incidence above which total internal reflection occurs, which is dependent on the refractive indices of both media on the boundary and determined by Snell's law of $n_1 \sin\theta^* = n_2 \sin(90°)$. Total internal reflection associated with a liquid droplet on a glass substrate involves two important angles that result from two interfaces (liquid-glass and vapor-glass).

The optical ray tracing about two important angles is illustrated in FIGS. 5A-5D. In the case of an incident angle larger than the critical angle of the liquid-glass interface, the propagated wave is totally reflected back internally at the interface (Rfl_1 and Rfl_2 in FIG. 5A). Meanwhile, if the incident angle is lower than the critical angle of the liquid-glass interface but higher than that of the vapor-glass interface, the wave propagation becomes more complicated. The wave striking the vapor-glass interface is totally reflected back (Rfl_1), but the wave reaching the liquid-glass interface under a droplet will be divided into two components; one is reflected at the liquid-glass interface (Rfl_2) and the other is transmitted through the liquid and is reflected at the vapor-liquid interface. i.e. the upper curved boundary of the droplet (Rfl_3, Rfl$_{-blocked}$, T$_{-scatt}$). The waves reflected at the curved droplet surface are not parallel to each other as in FIG. 5B and direct to different ways depending on the incident angle normal to the profile of droplet surface. A portion of the waves striking the top of the droplet surface is internally reflected back with a similar angle (Rfl_3) as the reflections at the interfaces of the vapor-glass (Rfl_1) and liquid-glass (Rfl_2) interfaces. The other waves striking the sides of the droplet surface will have severe aberration in their propagation (Rfl$_{-blocked}$, T$_{-scatt}$) and will not be captured in the aperture-mounted detector.

FIG. 5C shows the effective reflection zone at the interface of liquid and vapor where only a small portion of the waves around the droplet's apex can pass through the aperture and be captured at the detector, while other waves are blocked because of large aberration. Another factor to consider in A-TIR measurement is the aberration of the beam path due to Goos-Hänchen effects occurring near the droplet's edge (FIG. 5D). The Goos-Hänchen (G-H) effect is a quantum phenomenon caused by the lateral shift of reflected waves in TIR mode and the axial shift of the penetrated waves into a medium. The lateral shift corresponds to a displacement $L_{GH}$ along the interface of the incident plane (see FIGS. 5A-5D). If the incident wave strikes close to the contact line of the droplet, the wave could come out of the vapor-liquid interface and be scattered into the vapor, not captured by the detector. The axial shift is not considered herein as most samples have thickness greater than the general penetration depth of 300 nm.

Thus, the parallel-reflected waves (Rfl_1, Rfl_2, and Rfl_3) can be selectively detected by placing an aperture in front of a detector as in FIG. 5B. The total reflectance R measured at the aperture-mounted detector consists of three individual reflectance paths as a function of incident angle:

$$R = Rfl\_1 + Rfl\_2 + Rfl\_3 \quad (1)$$

The aperture produces the unique pattern of the reflectance curve, which is a characteristic of this measurement distinguished from the classical method. The morphological features of the droplet pattern can be obtained from the measured reflectance curves. Without an aperture, the reflectance curve would be similar to those seen in classical TIR measurements.

The instant example employs a novel use of TIR measurement utilizing a modified Fresnel equation with parameters to simulate the reflectance measured with an aperture-mounted detector in TIR configuration. FIG. 6 shows the optical ray-tracing for the three parallel-reflected rays (Rfl_1, Rfl_2 and Rfl_3) captured in the aperture-mounted detector in FIG. 5B, where a liquid droplet is on a slide glass placed on an equilateral triangle prism in an internal reflection configuration. The incident light beam entering the prism is divided into three different paths depending on the interfaces on which the beam is reflected. Each reflectance will be expressed with the modified Fresnel equations for each ray with the corresponding parameters reflecting the geometric features of the droplet pattern.

The Reflectance at Glass-Air Interface (Rfl_1) and Coverage Fraction ($\beta$)

The ray reaches the glass-air interface only in areas that are not covered by liquid droplets on the glass surface. The ray is totally (if $\theta_{incident} \geq 35.3°$) or partially (if $\theta_{incident} < 35.3°$) reflected depending on the incident angle ($\theta_{incident}$), which is indicated as "Rfl_1" in FIG. 6. The modified reflectance of this ray is based on Fresnel equations with some parameters as follows:

$$Rfl\_1 = \alpha(1-\beta)(1-\gamma_1)|t_{12}|^2|r_{21}|^2|t_{21}|^2 \quad (2)$$

where t and r are the transmission and reflection coefficients of the Fresnel equation, the subscripts '1' and '2' indicate the medium of air and glass, respectively. $\alpha$ is the transmission ratio, and $\beta$ is the coverage fraction. The transmission and reflection coefficient are as follows:

$$t_p = \frac{2n_i \cos\theta_i}{n_t \cos\theta_i + n_i \cos\theta_t} \quad (3\text{-}1)$$

$$t_s = \frac{2n_i \cos\theta_i}{n_i \cos\theta_i + n_t \cos\theta_t} \quad (3\text{-}2)$$

$$r_p = \frac{n_t \cos\theta_i - n_i \cos\theta_t}{n_t \cos\theta_i + n_i \cos\theta_t} \quad (3\text{-}3)$$

$$r_s = \frac{n_i \cos\theta_i - n_t \cos\theta_t}{n_i \cos\theta_i + n_t \cos\theta_t} \quad (3\text{-}4)$$

The subscripts 'i' and 't' indicate the incident and transmitted media at interface, respectively. $|t_{12}|^2$ and $|t_{21}|^2$ are the transmittances occurring at both side interfaces of the prism where the wave enters and exits, respectively. $|r_{21}|^2$ is the reflectance of the wave propagating from glass to air on the top of prism, and it has a maximum of 1 at an incident angle larger than 35.3° normal to the air-glass boundary. The last parameter of $\gamma 1$ is related to the additional attenuation of reflectance $|r_{21}|^2$ particularly near the critical angle of 35.3°, which is caused by a Goos-Hänchen (G-H) shift.

The first parameter $\alpha$ is the transmission ratio through the substrate medium composed of a prism, a slide glass, and an index-matching fluid. In this experiment, α was empirically estimated as approximately 95% by comparing the intensities of the entering and exiting beams. Experimental measured reflectance of Rfl_1 agrees well with the calculation by Eq. 2 with α=95%. This 95% value of α is consistently applied to all equations herein.

The second parameter β is the coverage fraction of droplets on the reflection zone of the glass surface. It is determined as the ratio of the measured area of droplets ($A_{drp}$) within the reflection zone and total area of the reflection zone ($A_{rfl}$):

$$\beta = \frac{A_{drplets}}{A_{rfl}} \qquad (4)$$

The area of the droplets, $A_{drplets}$ is determined from the image processing of the droplet pattern using Matlab software. The area of the reflection zone, $A_{rfl}$ is based on the plane-cylinder intersection shaping an ellipse that has an enlarged reflection length with increasing incident angle (FIGS. 7A-7B) and can be calculated as πbw where b is the reflection length and w is the laser width. The area of the droplets is determined numerically through the image processing algorithm. The coverage fraction β slightly changes depending on the incident angles and the surface coating conditions. The change in coverage fraction β due to varying incident angles is less than 1% for the most droplet radius as in FIGS. 7A-7B, small but substantial variation the simulated reflectance curves. Eq. 2 is formulated with the uncovered area portion. (1−β) since Rfl_1 is about the reflectance at the air-glass interface of $|r_{21}|^2$.

The Reflectance at the Glass-Liquid Interface (Rfl_2) and the Goos-Hänchen Shift Ratio (γ)

The ray strikes a glass-liquid interface under a droplet, called "Rfl_2" in FIGS. 7A-7B. It can be reflected totally (if $\theta_{incident} \geq 58.5°$) or partially (if $\theta_{incident} < 58.5°$), depending on the incident angles. The modified reflectance of the second path is expressed as:

$$Rfl\_2 = \alpha\beta(1-\gamma_2)|t_{12}|^2|r_{23}|^2|t_{21}|^2 \qquad (5)$$

where $|r_{23}|^2$ is the reflectance of the wave at the interface between a slide glass and a droplet. The subscript '3' indicates the sample medium. Since Rfl_2 is the reflectance for the covered area of droplets on glass surface, the coverage fraction β is used—unlike the reflectance of the first ray, Rfl_1.

The parameter $\gamma_2$ is the attenuation factor of the reflectance of the second ray, Rfl_2, similar to $\gamma_1$ in the reflectance of the first ray, Rfl_1. In general, $|r_{23}|^2$ is maximized at an incident angle larger than the critical TIR angle of the glass-liquid interface. However, $|r_{23}|^2$ can be attenuated above the critical angle of 58.5° when the Goos-Hänchen (G-H) shift affects the beam path. The G-H effect is a quantum phenomenon in which a polarized beam undergoes a minute lateral shift along the interface of the incident plane under TIR mode [5-8]. The lateral G-H shift ($L_{GH}$) for p- and s-polarization can be expressed as:

$$(L_{GH})_p = \frac{1}{\pi\cos\theta} \cdot \frac{K\sin\theta\cos^2\theta}{K^2\cos^2\theta + \sin^2\theta - n^2} \cdot \frac{\lambda_1}{(\sin^2\theta - n^2)^{\frac{1}{2}}} \qquad (6\text{-}1)$$

$$(L_{GH})_s = \frac{1}{\pi\cos\theta} \cdot \frac{\mu\sin\theta\cos^2\theta}{\mu^2\cos^2\theta + \sin^2\theta - n^2} \cdot \frac{\lambda_1}{(\sin^2\theta - n^2)^{\frac{1}{2}}} \qquad (6\text{-}2)$$

where $n^2 = K\mu$, and for glasses $n^2 = K$. Also, $n = n_2/n_1$ and $\lambda_1 = \lambda_{vacuum}/n_1$. The lateral G-H shift is calculated as around a few microns at the critical angles of the air-glass and liquid-glass interfaces and exponentially decreases away from it.

The Reflectance at the Liquid-Air Interface (Rfl_3)

The ray passes through the glass-liquid interface with an incident angle lower than the critical angle of 58.5°, which is shown as "Rfl_3" in FIG. 6. This path is derivative from the partial reflection of the second ray with an incident angle from 35.3° to 58.5° normal to the glass-liquid interface. It is total-internally reflected at the upper boundary of the droplet, i.e. the liquid-air interface, and then turns back to the liquid-glass interface at the bottom of the droplet with an external reflection mode. A part of light passes through the liquid-glass interface and finally exits the prism.

3-D Ray Tracing with the Modified Fresnel Equation

Three-dimensional (3-D) ray tracing is employed in order to calculate the Rfl_3 exactly with the modified Fresnel equation. For 3-D ray tracing, the laser intensity is experimentally measured as in FIG. 8A and curve-fitted with two-Gaussian functions as in FIG. 8B.

With this measured intensity distribution, Rfl_3 is calculated using the following expression:

$$Rfl\_3 = \sum \frac{I_{i,xz}}{I_{incoming}} = \sum_z \sum_x \alpha\beta'|t_{12,xz}|^2|t_{23,xz}|^2|r_{31,xz}|^2|t_{32,xz}|^2|t_{21,xz}|^2 \qquad (7)$$

where $$\beta' = \frac{\kappa_{xz}}{I_{incoming}}$$

and κ is the curve fitted function for the measured laser intensity as in FIGS. 8A-8B. The summation of $\kappa_{xz}$ across the laser cross-sectional area is equal to the incoming laser intensity, $I_{incoming}$.

FIG. 9 illustrates the schematic of the 3-D ray tracing calculation. The top view in the figure shows the lens effect resulting in the accumulation of the ray reflected on the top curved liquid-air interface in the off-axis locations. The laser intensity is divided with a 1 μm interval for its 800 μm diameter. Ray tracing is conducted for each ray. Fresnel reflection and transmission calculation are done with the ray tracing. 3-D ray tracing requires much more calculation and algorithm than the initially tried 2-D calculation. The program is developed with Matlab software and the calculated node is ~6 million elements with the horizontal (x-axis), the depth (z-axis), and the vertical (y-axis) directions with the incidence angles from 30 to 70 degrees with around 1 degree interval. The zoom-in view of the overview shows the schematic of the ray tracing on the screen with Rfl_1, Rfl_2 and Rfl_3 with blue, green, and red color, respectively, with Rfl_1 and Rfl_2 targeting around the center region as they are reflections of laser on the plane interface between the glass-air and glass-liquid, respectively. Rfl_3 presents the dispersed beam profile in vertically (mostly in y-axis) and in depth direction (in z-axis). The spherical shape of droplet causes the lens effect and its refracted rays deviate significantly in vertical direction (in y-axis). Hence, the apertures with various sizes from 2 to 10.3 mm in diameter, placed in front of the detector with the size of 10.3 mm in diameter, are expected to collect the signatures of the droplets profile such as the thickness and the diameter.

2-D Modeling with the Flatness Effect (δ)

Furthermore, 2-D simple modeling is conducted for the Rfl_3 calculation. Rfl_3 can be calculated as the following simple expression with the parameter of the flatness efficiency, δ;

$$Rfl\_3 = \alpha\beta\delta|t_{12}|^2|t_{23}|^2|r_{31}|^2|t_{32}|^2|t_{21}|^2 \qquad (8)$$

where δ is the flatness efficiency that is associated with the fraction of a droplet's upper surface that makes the third ray apparently parallel to the first and second rays. A droplet may have an effective reflection zone around its apex where the reflected ray can pass through an aperture and reach to a detector. FIG. 10 shows a geometric illustration calculating the effective reflection zone based on a spherical cap droplet profile. It also presents some relevant equations with an aperture radius of $r_a=1$ mm and the distance between the sample to the detector L=100 mm, including the flatness effect ratio of δ that is defined as the ratio of effective reflection zone to droplet area.

$$\delta = \frac{A_{eff}}{A_{drp}} = \frac{r^2}{a^2} = \frac{(a^2+h^2)^2 \cdot r_a^2}{16a^2 h^2 L^2} \qquad (9)$$

where r is the radius of the effective reflection zone, a is the radius of the droplet, and h is the thickness of the droplet. δ ranges approximately from 0.000032 to 0.0035 depending on the difference of droplet profile due to the different size droplets. The curvature of droplet profile caused arithmetic deduction on the reflectance $|r_{31}|^2$. The rays scattered by the curved surface of the droplet are excluded from the aperture-mounted detector as they are seriously out of the optical axis along the direction of ray propagation. As the radius of curvature increases, the flatness ratio δ increases as well. For instance. δ=0.1 is obtained in a droplet with a curvature radius of 16 mm, which would be an ultra-thin droplet with a 500-μm diameter and a 2-μm height. The higher value of δ means more reflectance to be captured by a detector and helps TIR curves reflectance increase. More flatness generally brings about higher δ. In addition, it is believed that the effective reflection zone can increase with a larger aperture.

The intensities of Rfl_1, Rfl_2, and Rfl_3 varies depending on the incident angles. The theoretical prediction of the reflectance curves depending on the parameters of the transmission ratio, α, the coverage fraction, β, the G-H shift, γ, and the flatness ratio, δ are shown in detail.

Total Internal Reflection Measurement

The experimental setup is illustrated in FIG. 11 with a schematic illustration on the left and a photo of the set-up on the right. An equilateral triangle prism (SF10, n=1.732 at 633 nm) is mounted on a translation stage combined with a vertical post, and a microcontact-printed slide glass (SF10) is placed on the upper surface of the prism. An immersion oil (n=1.730) is used to ensure the index matching without an air gap between the prism and the slide glass. A He—Ne laser (λ=633 nm) is mounted on a straight rail that pivots around the prism, and a digital protractor (resolution=0.01°, accuracy=0.05°) is attached to the rail. A collimated beam (d=0.8 mm) emitted from the laser is incident and refracted on the left surface of the prism, and then the beam passing through the prism is incident on the upper surface of the slide glass. The final incident angle on the slide glass is calculated with the rail angle measured by the protractor and Snell's law, $\sin\theta_{rail} = n_{SF10} \sin\theta_{incident}$. The laser beam reflected internally at the glass surface comes out of the prism, and its intensity is measured by using an optical power detector while the incident angle changes from 30° to 75°. A small aperture ($r_a=1$ mm) is placed in front of the power detector in order to cut off the highly aberrated beams caused by the curved surface of the micro droplets. The reflectance is determined as the ratio of the power measured behind the cut-off aperture to the original power measured prior to entering the prism. A CCD camera is used to observe the reflected light at the same position on the glass surface by adjusting the translation stage. The triolein oil is used for the measurement with very large droplet on the slide and measured to have the refractive index of 1.477. The microcontact printing (μCP) is used to make the micro droplets on the slide.

The Effect of the Coverage Fraction

Aperture-TIR measurement was done for the PDMS-stamped micro droplets using an aperture-mounted detector and the measured reflectance was compared with the calculation using the modified Fresnel equation in section 2 in order to confirm the validity of the estimated parameters. FIGS. 12A-12C present the measured reflectance from micro droplets printed by PDMS stamping on three different coating surfaces, i.e., oleophilic coating (FIG. 12A), plain glass (FIG. 12B), and oleophobic coating (FIG. 12C). The presented data are the mean values of three individual measurements.

The calculated reflectance is from Eqs. 1, 2, 5, and 7 with four parameters (α, β, γ and δ). The value of α is identically 0.95 for all substrates since it is not affected by the condition of the coating surface. The other parameters (β, γ, and δ) are estimated differently due to the geometric features of droplet patterns. Reflectance shows a decreasing trend in the middle angle range ($35.3° < \theta_{incident} < 58.5°$) in the order of droplet (c), (b), and (a) with decreasing oleophobicities as the coverage fraction β increases. Reflectance curves do not show very curved profiles around the critical angles because of the low G-H ratio γ (mostly less than 1%). The calculation with the estimated parameters agrees well with the measurement, indicating the parameters are reasonably estimated.

The Reflection at the Curved Droplet Surface, Rfl_3

The reflectance at the curved surface of the droplet causes the lens effect which make the reflected beam have a broad profile, which is verified by 3-D ray tracing with the modified Fresnel modeling. Macro-size droplet (FIG. 13A) is used as it can effectively produce the broad profiles big enough to be easily detected. The images at top row in FIG. 13B show the experimentally recorded Rfl_3 beam profiles on the screen using color camera at the representative incident angles; 54.2, 45.9, and 33.7 degrees, respectively. The images are recorded at the location of 150 mm away from the sample location on the prism, which gets larger with the decreasing incident angles as the optical path through the prism gets longer, resulting in more dispersion especially in vertical direction. The simulated images at the bottom row presents a good agreement with the experiment in its beam dimension and its intensity.

FIG. 13C shows the centerline normalized intensity distribution for each angle in (b) along the center dash-dot line. The intensities are normalized against the maximum at the critical angle. The experiment data are in solid symbols and the simulation results are solid lines in red, green, and blue colors for 54.2, 45.9, and 33.7 degrees, respectively, which shows a good agreement, indicating that 3-D ray-tracing with the modified Fresnel modeling works well.

The Effect of the Aperture Size

Various sized apertures are tested to explore its effect on the A-TIR reflectance in p and s polarization as in FIG. 14. The inset photos show its macro-size droplet; the diameter of 6.5 mm and the thickness of 343 μm. The droplet size is big enough so that the laser is confined by the liquid droplet with targeting at the apex of the droplet. Thus, only Rfl_2 and Rfl_3 components are generated in Eq. 1. The reflectance measured at the apertures of 2, 4, and 8 mm are colored in blue, red, and orange, respectively. The p and s polarization are shown as filled and hollow symbols for the experiment and solid and dash lines for the simulation. It shows a very good agreement between the experiment and the simulation, indicating the modified Fresnel modeling based on 3-D ray tracing describes very well the optics phenomena in aperture total internal reflection (A-TIR).

After verifying the reflected beam profile (Rfl_3) from the top curved surface and the aperture effect from the macro-sized droplet, the modified Fresnel modeling is applied to the micro droplet pattern as in FIGS. 15A-15B. The FIG. 15A shows a good agreement between the experiment and the simulation for various apertures. The inset photo is a micro droplet pattern used. The FIG. 15B presents the contribution of each reflectance. Rfl_1, Rfl_2, and Rfl_3 in green, blue, and red colors, respectively, where the aperture of 10.3 mm contributes the maximum out of the given apertures with the aperture of 2 mm contributing the minimum. The variation of Rfl_3 explains the change of the total reflectance curve in the left.

The region marked as "transition" in (a) across the critical angle of the glass-oil interface shows deviation between the experiment and the simulation, especially for the smallest aperture (2 mm). G-H effect is considered herein, but only in lateral direction, meaning the depth direction also needs to be considered in G-H shift.

The Determination of the Droplet Thickness and the Contact Angle

The modified Fresnel modeling can be applied to determine the morphological features of droplet such as the thickness and the contact angle. The flatness ratio, δ is obtained by equaling the reflectance, Rfl_3 (Eq. 7) from the 3-D ray tracing with the modified Fresnel modeling to the reflectance (Eq. 8) from 2-D modeling with the flatness effect. From the determined flatness ratio, δ and the Eq. 9, the thickness can be obtained as in FIG. 16 which shows a reasonable agreement with the measured thickness from Fizeau interference.

Furthermore, based on the spherical profile relation of $\theta_c = 2 \times \tan^{-1}(h/a)$ where $\theta_c$ is the contact angle of the droplet, the contact angle can be determined with the thickness by A-TIR in FIG. 17. The determined contact angle is compared with the one by Fizeau interferometry for the micro droplets, showing a good agreement each other. The micro droplets by the μCP method shows the contact angle from 1° to 6°. This observation is remarkable as it is not easy to measure very small contact angle with the existing techniques. The 95% confidence interval is indicated for each data, showing good confidence.

The invention claimed is:

1. A method of measuring a contact angle of a liquid droplet, said method comprising the steps of
   analyzing the liquid droplet using aperture total internal reflection (A-TIR), wherein the A-TIR comprises placement of one or more apertures in front of a detector in total internal reflection (TIR) configuration, wherein at least two apertures are utilized and
   calculating the contact angle based on the analysis.

2. The method of claim 1, wherein the contact angle is between 0 degrees and 90 degrees.

3. The method of claim 1, wherein the contact angle is less than 5 degrees.

4. The method of claim 1, wherein the feature is thickness of the liquid droplet.

5. The method of claim 4, wherein the thickness is a microscale thickness.

6. The method of claim 1, wherein the object is a surface, and wherein the surface is a fingerprint surface or a coated surface.

7. The method of claim 1, wherein the calculating comprises use of one or more algorithms.

8. The method of claim 1, wherein the analysis comprises optical reflection.

9. The method of claim 1, wherein the analysis comprises a refractive index.

10. The method of claim 1, wherein the analysis comprises reflection interference.

11. The method of claim 1, wherein the analysis comprises transmission interference.

12. The method of claim 1, wherein the analysis comprises ray tracing.

13. The method of claim 1, wherein the analysis comprises optical ray tracing.

14. The method of claim 1, wherein the analysis comprises 3-D ray tracing.

15. The method of claim 1, wherein the analysis comprises Fizeau interferometry.

16. The method of claim 1, wherein the method provides real-time monitoring of the contact angle.

17. The method of claim 1, wherein the method provides full-field monitoring of the contact angle.

18. The method of claim 1, wherein the method is capable of measuring a contact angle from 2.5 to 17 degrees.

19. The method of claim 1, wherein the method is capable of measuring a contact angle of 1 degree.

20. The method of claim 1, wherein the method further comprises analysis considering morphological features selected from the group consisting of thickness, surface coverage fraction, effective flatness ratio, Goos-Hänchen shift ratio, and any combination thereof.

* * * * *